United States Patent
Lippa et al.

(10) Patent No.: US 7,946,273 B2
(45) Date of Patent: May 24, 2011

(54) FUEL SYSTEM FOR MULTI-FUEL ENGINE

(75) Inventors: Allan J. Lippa, Northville, MI (US);
Donald J. Lewis, Vancouver, WA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/961,937

(22) Filed: Dec. 7, 2010

(65) Prior Publication Data

US 2011/0073057 A1 Mar. 31, 2011

Related U.S. Application Data

(63) Continuation of application No. 12/184,081, filed on Jul. 31, 2008, now Pat. No. 7,845,334.

(51) Int. Cl.
*F02B 7/00* (2006.01)
*F02B 13/00* (2006.01)

(52) U.S. Cl. ........................... 123/431; 123/575

(58) Field of Classification Search .............. 123/431, 123/299, 300, 304, 559.1, 564, 575, 577, 123/316, 672; 701/103, 104; 137/147, 571, 137/590, 565.11, 565.16; 280/833

See application file for complete search history.

(56) References Cited

U.S. PATENT DOCUMENTS

| | | | | | |
|---|---|---|---|---|---|
| 3,724,481 | A | * | 4/1973 | Schutzenauer | 137/101.25 |
| 4,212,889 | A | * | 7/1980 | Fuentevilla | 426/7 |
| 5,197,444 | A | * | 3/1993 | Lang et al. | 123/514 |
| 5,360,034 | A | * | 11/1994 | Der Manuelian | 137/571 |
| 5,417,239 | A | * | 5/1995 | Ford | 137/571 |
| 5,555,873 | A | * | 9/1996 | Nolen | 123/575 |
| 6,494,226 | B2 | * | 12/2002 | Tipton et al. | 137/1 |
| 6,792,966 | B2 | * | 9/2004 | Harvey | 137/265 |
| 6,845,782 | B2 | * | 1/2005 | Osterkil et al. | 137/1 |
| 6,920,866 | B2 | * | 7/2005 | Leini et al. | 123/514 |
| 7,182,071 | B2 | * | 2/2007 | Hansson | 123/514 |
| 7,225,787 | B2 | * | 6/2007 | Bromberg et al. | 123/198 A |
| 2004/0163631 | A1 | * | 8/2004 | Leini et al. | 123/510 |
| 2006/0037587 | A1 | * | 2/2006 | Mc Clure et al. | 123/509 |
| 2008/0221778 | A1 | * | 9/2008 | Kakuho et al. | 701/103 |
| 2009/0112450 | A1 | * | 4/2009 | Connor | 701/111 |

* cited by examiner

*Primary Examiner* — Mahmoud Gimie
(74) *Attorney, Agent, or Firm* — Allan J. Lippa; Alleman Hall McCoy Russell & Tuttle LLP

(57) ABSTRACT

An engine system and corresponding control method are described. As one example, the control method includes transferring one type of fuel from one fuel tank to a second fuel tank holding another type of fuel and adjusting an engine operating parameter based on the blended fuel mixture by selective operation of a first and second fuel pump.

20 Claims, 18 Drawing Sheets

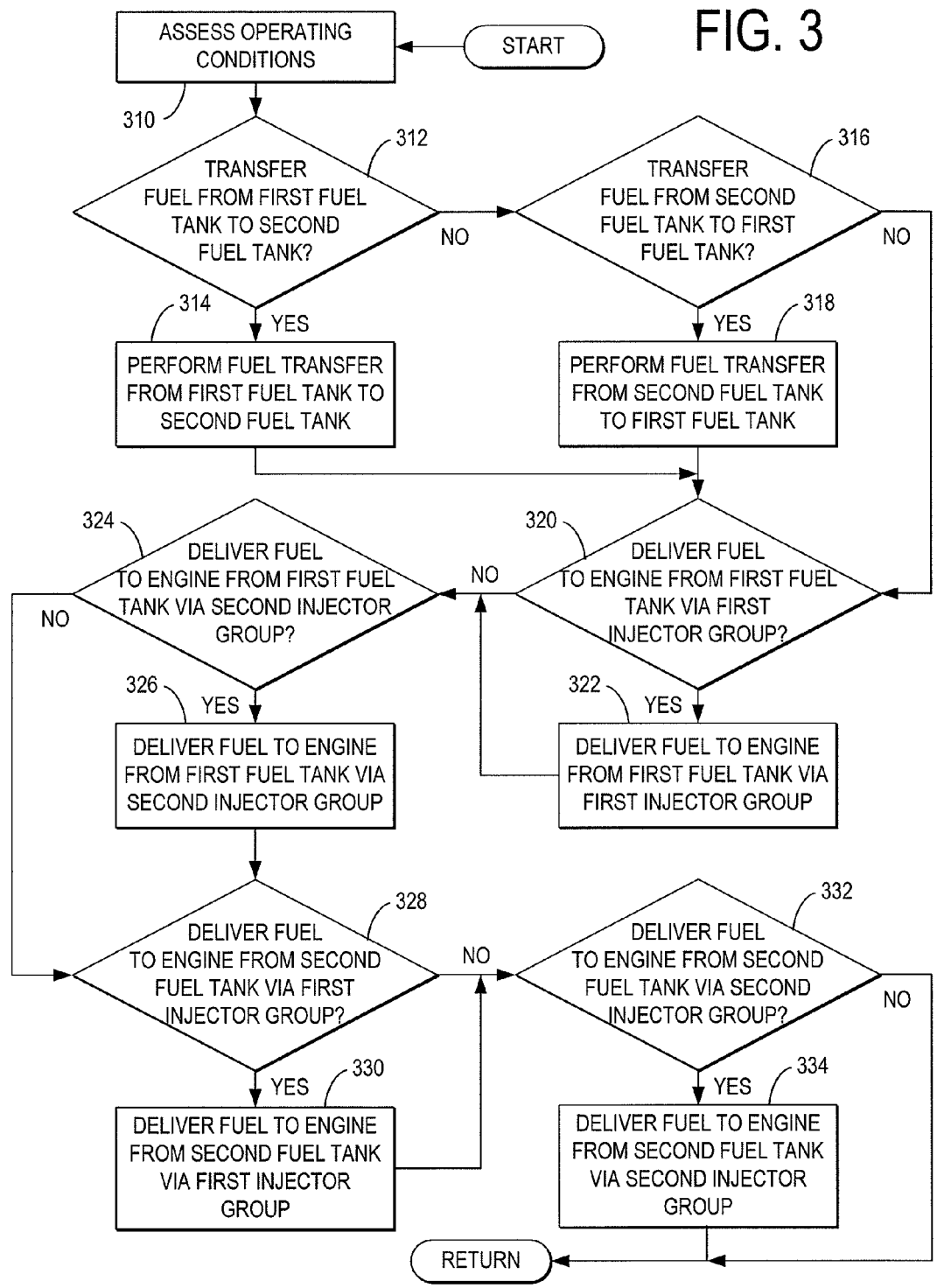

| MODE | INJECTORS 962 | INJECTORS 960 | FUEL PUMP 934 | FUEL PUMP 924 | FUEL SOURCE | FUEL SINK |
|---|---|---|---|---|---|---|
| 1 | ON | OFF | $P_A$ | OFF | FUEL TANK 930 | INJECTORS 962 |
| 2 | ON | ON | $P_B$ | OFF | FUEL TANK 930 | INJECTORS 960 |
| | | | | | | INJECTORS 962 |
| 3 | OFF | ON | $P_B$ | OFF | FUEL TANK 930 | INJECTORS 960 |
| 4 | OFF | ON | OFF | $P_D$ | FUEL TANK 920 | INJECTORS 960 |
| 5 | ON | ON | OFF | $P_E$ | FUEL TANK 920 | INJECTORS 960 |
| | | | | | | INJECTORS 962 |
| 6 | ON | OFF | OFF | $P_E$ | FUEL TANK 920 | INJECTORS 962 |
| 7 | ON | ON | $P_A, P_B, P_C$ | $P_A, P_B, P_C$ | FUEL TANK 930 | INJECTORS 962 |
| | | | | | FUEL TANK 920 | INJECTORS 960 |
| 8 | OFF | OFF | $P_C$ | OFF | FUEL TANK 930 | FUEL TANK 920 |
| 9 | OFF | OFF | OFF | $P_F$ | FUEL TANK 920 | FUEL TANK 930 |
| 10 | ON/OFF | ON/OFF | $P_C$ | OFF | FUEL TANK 930 | FUEL TANK 920 |
| | | | | | | INJECTORS 962/960 |
| 11 | ON/OFF | ON/OFF | OFF | $P_F$ | FUEL TANK 920 | FUEL TANK 930 |
| | | | | | | INJECTORS 962/960 |

Example Pressure Settings:  Fuel Pump 934: $P_A < P_B < P_C$   Fuel Pump 924: $P_D < P_E < P_F$

FUEL SYSTEM FOR MULTI-FUEL ENGINE

CROSS REFERENCE TO RELATED APPLICATIONS

The present application is a continuation of U.S. patent application Ser. No. 12/184,081 filed Jul. 31, 2008, now U.S. Pat. No. 7,845,334, the entire contents of which are incorporated herein by reference.

BACKGROUND AND SUMMARY

Various fuel delivery systems may be used to provide a desired amount of fuel to an engine for combustion. Some fuel delivery systems utilize port fuel injectors to deliver fuel to each of cylinder of the engine. Other fuel delivery systems utilize direct fuel injectors to deliver fuel directly to each cylinder of the engine. Still other engines have been described that utilize both port and direct fuel injectors for each cylinder to deliver different types of fuel to the engine.

One example is described in the papers titled "Calculations of Knock Suppression in Highly Turbocharged Gasoline/Ethanol Engines Using Direct Ethanol Injection" and "Direct Injection Ethanol Boosted Gasoline Engine: Biofuel Leveraging for Cost Effective Reduction of Oil Dependence and CO2 Emissions" by Heywood et al. Specifically, the Heywood et al. papers describe directly injecting ethanol into the cylinders to improve charge cooling effects, while relying on port injected gasoline to provide the majority of the combusted fuel over a drive cycle.

In one particular example, if the ethanol fuel is used up before the gasoline fuel, the engine may experience increased knock at higher boost levels. As a result, the boost level may be reduced while the engine is operated with port injected gasoline fuel.

The inventors herein have recognized several issues with this approach. For example, such an approach results in significantly reduced available boost, and thus engine output torque. Specifically, since the engine relies on port injected gasoline when the ethanol is used up, not only are the charge cooling effects of ethanol's increased heat of vaporization lost, but also the charge cooling effects of direct injection.

To address these and other issues, the inventors herein have provided a method for controlling an internal combustion engine to deliver a desired engine output. The method comprises: delivering a first fuel blend from a first fuel tank to the engine; delivering a second fuel blend from a second fuel tank to the engine, the proportion of said second fuel blend delivered to the engine to said first blend delivered to the engine being related to the desired engine output; transferring said first fuel blend from said first fuel tank to said second fuel tank to prevent an amount of said first fuel blend and said second fuel blend in said second fuel tank from falling below a predetermined level; and boosting air delivered to the engine, the amount of boosting being related to latent heat of vaporization or alcohol concentration of said second fuel blend delivered to the engine.

In this way, fuel (albeit possibly with a lower heat of vaporization) is available for direct injection even when the primary direct injection fuel (e.g. ethanol) is exhausted prior to the other fuels residing on-board the vehicle. In this way, it is possible to at least obtain charge cooling benefits of direct injection, and therefore the engine may be operated with a greater amount of boost than if using port injected gasoline. As such, even if the boost is somewhat reduced, the amount of reduction may be lowered.

Further, where fuel is transferred among two or more fuel tanks in the system, it is possible to compensate for a resulting change in composition of the fuel or fuel blend that may occur as a result of the fuel transfer. As one example, a fuel transfer may create a mixture of two or more fuels or fuel blends that exhibits a lower knock suppression capability than the fuel or fuel blend that was initially available to the direct injectors. However, since fuel delivery via the direct injectors may be maintained by the transfer of fuel, substantial knock suppression may still be realized even if the transferred fuel exhibits a lower knock suppression capability than the original fuel.

In other words, the inventors herein have recognized that direct injection of fuel can provide greater charge cooling affects than port injection, even when the fuel available to the direct injectors has a reduced latent heat of vaporization. Furthermore, the level of boost provided to the engine by a boosting device such as a turbocharger or supercharger may be optionally adjusted in response to the resulting composition of the fuel mixture that is created by the fuel transfer, thereby further reducing or eliminating engine knock.

BRIEF DESCRIPTION OF THE DRAWINGS

FIGS. 3-5 depict example process flows that may be executed by the control system.

FIG. 13 is a mode table depicting at least some of the fuel delivery modes that may be performed by the fuel delivery systems described herein.

DETAILED DESCRIPTION

The following disclosure presents a fuel delivery system that may be configured to deliver one or more different fuels to a fuel burning engine. These fuels may include liquid fuels, gaseous fuels, or combinations of liquid and gaseous fuels. In some embodiments, the fuel burning engine may form an engine system of a vehicle, including vehicles powered exclusively by fuel and hybrid electric vehicles (HEV), among others. While a fuel burning engine is described in the context of an internal combustion engine for a vehicle, it should be appreciated that the various fuel delivery approaches described herein are not limited to the disclosed engine configurations or applications, but may be used in other suitable configurations or applications where appropriate.

In some embodiments, a fuel delivery system may be operated to deliver to an engine, two or more fuels having different fuel compositions from two or more different fuel sources. As a non-limiting example, a first fuel including at least a hydrocarbon component may be delivered to the engine from a first fuel storage tank via a first fuel injector while a second fuel including at least an alcohol component may be delivered to the engine from a second fuel storage tank via a second fuel injector. In some examples, one or more of these fuels may comprise fuel mixtures or blends of two or more different fuel components. For example, the second fuel can include a mixture or blend of both alcohol and hydrocarbon components. Beyond the different physical properties of the two or more different fuels utilized by the fuel delivery system, these fuels may have different costs. For example, a first fuel may cost less per unit volume or mass than a second fuel. Thus as will be described herein, the relative amount of each fuel that is delivered to the engine may be varied by a control system in response to various operating conditions, to improve engine operation and/or reduce fueling costs associated with the engine.

In some embodiments, a fuel delivery system may be configured to transfer a first fuel from a first fuel storage tank to a second fuel storage tank where it may be mixed with a second fuel having a different composition than the first fuel to form a fuel mixture. Furthermore, in some embodiments, a control system may be configured to adjust one or more operating parameters of the engine, including engine boost, relative amount of each fuel delivered to the engine, and the specific location of delivery for each fuel in response to the composition of each fuel that is available to the engine. Thus, in at least some examples, engine knock may be reduced by selectively adjusting various operating parameters of the engine in response to the type of fuels available for delivery to the engine by the fuel delivery system.

Figure 1:
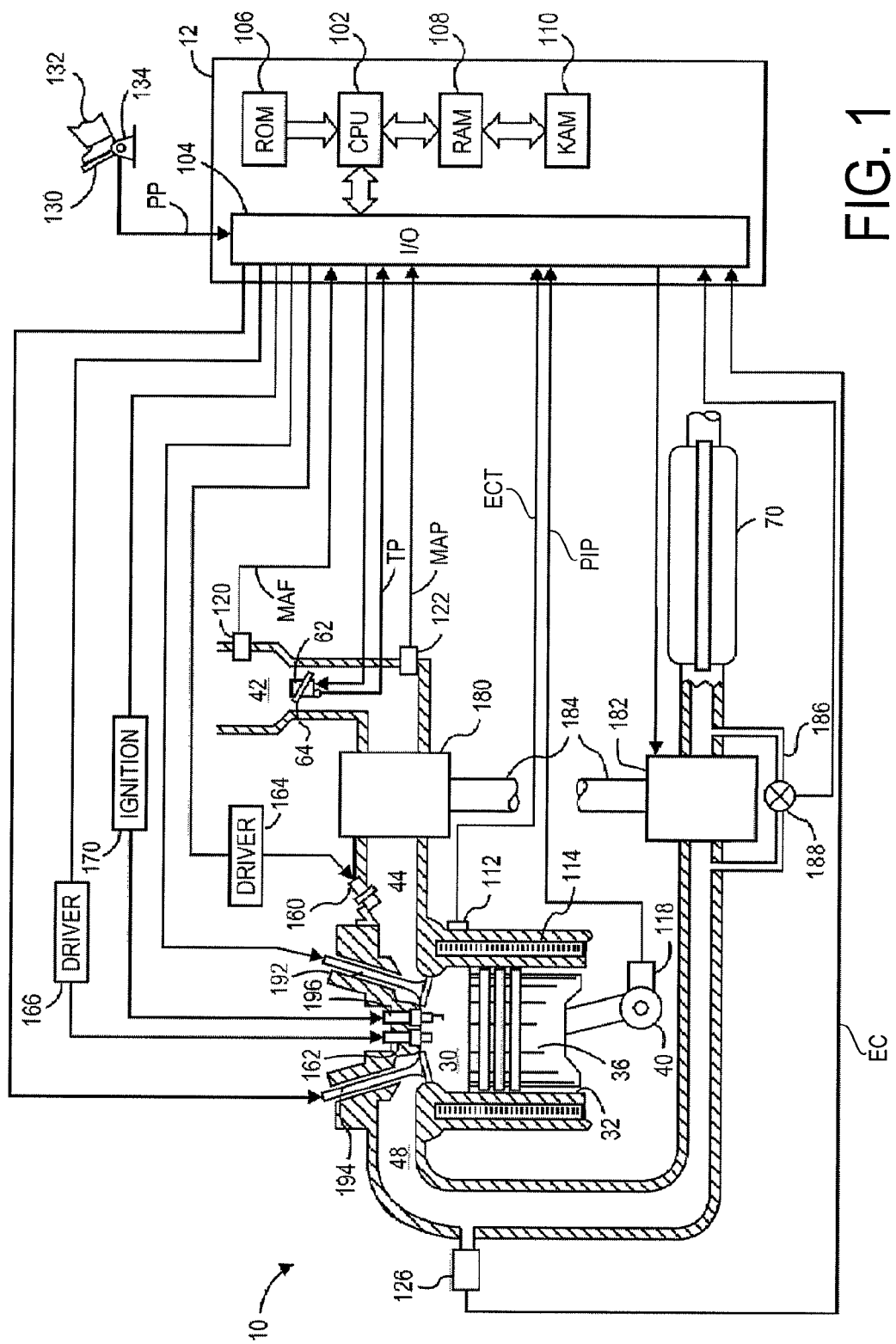
FIG. 1 schematically depicts an example embodiment of a cylinder of an internal combustion engine.

FIG. 1 schematically depicts a non-limiting example embodiment of a combustion chamber or cylinder 30 of an internal combustion engine 10. While engine 10 is described in the context of cylinder 30, it should be appreciate that engine 10 may include one or more other cylinders. For example, engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 30.

Cylinder 30 may be defined by combustion chamber walls 32 and piston 36. Piston 36 can be configured to reciprocate within cylinder 30 and may be coupled to crankshaft 40 via a crank arm. Other cylinders of the engine may also include respective pistons that are also coupled to crankshaft 40 via their respective crank arms.

Cylinder 30 can receive intake air via intake air passage 42 and intake manifold 44. Intake manifold 44 can communicate with other cylinders of engine 10 in addition to cylinder 30. In some embodiments, intake passage 42 can be configured with a boosting device such as a turbocharger or a supercharger. For example, FIG. 1 shows engine 10 configured with a turbocharger including a compressor 180 arranged along intake passage 42 upstream of intake manifold 44 and an exhaust turbine 182 arranged along exhaust passage 48. Compressor 180 can be at least partially powered by exhaust turbine 182 via a shaft 184 in the case of a turbocharger. However, in other examples, such as where engine 10 is provided with a supercharger, turbine 182 may be optionally omitted, whereby compressor 180 may be powered by mechanical input from a motor or the engine.

Exhaust passage 48 can receive exhaust gases from cylinder 30, and additionally from other cylinders of engine 10. Exhaust turbine 182 may optionally include a bypass passage 186 and valve 188 for adjusting an amount of exhaust gases bypassing turbine 182. In some embodiments, a level or amount of boosted intake air provide to the engine cylinders may be varied by adjusting an operating parameter of compressor 180. For example, a level of boost provided by compressor 180 may be adjusted by varying an amount of the exhaust gases bypassing turbine 182 via passage 186. Additionally or alternatively, in some embodiments, one or both of turbine 182 and compressor 180 may include variable geometry components to provide active adjustment of the blade, fan, or impeller geometry of the compressor or turbine. Further still, in some embodiments, compressor 180 may optionally include a compressor bypass for enabling the intake air to at least partially bypass compressor 180, thereby providing yet another way for adjusting the level of boosted intake air provided to the engine cylinders.

Exhaust passage 48 may include one or more exhaust aftertreatment devices indicated generally at 70. A throttle 62 including a throttle plate 64 may be provided in intake passage 42 for varying the flow rate and/or pressure of intake air provided to intake manifold 44. Each cylinder of engine 10 may include one or more intake valves and one or more exhaust valves. For example, cylinder 30 is shown including at least one intake valve 192 and at least one exhaust valve 194. In some embodiments, each cylinder of engine 10, including cylinder 30, may include at least two intake valves and at least two exhaust valves. These intake valves and exhaust valves may be opened and closed by any suitable actuator, including electromagnetic valve actuators (EVA) and cam-follower based actuators, among others. Each cylinder of engine 10 may include a spark plug indicated schematically at 196 with reference to cylinder 30.

Each cylinder of engine 10 may be configured with or may include one or more fuel injectors for providing fuel thereto. As a non-limiting example, cylinder 30 may be configured with a first fuel injector 160 and a second fuel injector 162. These fuel injectors may be configured to deliver fuel to different locations of the engine relative to cylinder 30. For example, fuel injector 160 may be configured as a port fuel injector that delivers fuel to cylinder 30 by injecting fuel upstream of the intake valves (e.g. valve 192), whereby the fuel is entrained into the cylinder by intake air received from intake manifold 44. The second fuel injector 162 may be configured as a direct in-cylinder fuel injector that delivers fuel directly into cylinder 30.

In other examples, each of fuel injectors 160 and 162 may be configured as direct fuel injectors for injecting fuel directly into cylinder 30. In still other examples, each of fuel injectors 160 and 162 may be configured as port fuel injectors for injecting fuel upstream of intake valve 192. In yet other examples, cylinder 30 may include only a single fuel injector that is configured to receive different fuels from the fuel delivery system in varying relative amounts as a fuel mixture, and is further configured inject this fuel mixture either directly into the cylinder as a direct fuel injector or upstream of the intake valves as a port fuel injector. As such, it should be appreciated that the fuel delivery systems described herein should not be limited by the particular fuel injector configurations described herein by way of example.

In some embodiments, engine 10 and the various fuel delivery systems described herein may be controlled by a control system 12. As a non-limiting example, control system 12 may comprise one or more electronic controllers. FIG. 1 depicts an example embodiment of control system 12, including at least one processor (CPU) 102 and memory such as one or more of read-only memory ROM 106, random-access memory RAM 108, and keep-alive memory (KAM) 110, which comprise computer-readable media that may be operatively coupled to the processor. Thus, one or more of ROM 106, RAM 108, and KAM 110 can include system instructions that, when executed by the processor performs one or more of the operations described herein, such as the process flow of subsequent the figures. Processor 102 can receive one or more input signals from various sensory components and can output one or more control signals to the various control components described herein via input/output (I/O) interface 104. In some examples, one or more of the various components of control system 12 can communicate via a data bus.

Control system 12 may be configured to receive an indication of operating conditions associated with engine 10 and its associated fuel delivery system via I/O interface 104. For example, control system 12 can receive operating condition information from various sensors, including: an indication of mass air flow (MAF) from mass air flow sensor 120; an indication of intake or manifold air pressure (MAP) from pressure sensor 122, an indication of throttle position (TP) from throttle 62, an indication of engine coolant temperature (ECT) from temperature sensor 112 coupled to cooling sleeve 114, and an indication of engine speed from a profile ignition pickup signal (PIP) from Hall effect sensor 118 (or other suitable engine speed sensor) coupled to crankshaft 40. The control system can further infer a quantity of air delivered to the engine or engine load based on the indication of throttle position, manifold pressure, mass airflow, and turbocharger conditions that are received from the various sensors. Further still, user input may be received by the control system from a vehicle operator 132 via an accelerator pedal 130 operatively coupled with a pedal position sensor 134, thereby providing an indication of pedal position (PP). The pedal position can provide the control system with an indication of a desired engine output of the vehicle operator.

The control system can also receive an indication of exhaust gas composition (EC) from exhaust gas sensor 126. As a non-limiting example, exhaust gas sensor 126 may include an exhaust gas oxygen sensor or other suitable exhaust gas sensor. The control system may be further configured to utilize feedback from exhaust gas sensor 126 to identify a resulting ratio of air and fuel delivered to the engine during previous combustion events, and to enable adjustment of the air and/or fuel in response to this feedback to obtain a prescribed air/fuel ratio.

Additionally, control system 12 may be configured to receive an indication of various operating conditions associated with the fuel delivery systems described herein, including an indication of an amount of fuel contained in each fuel storage tank and a composition of each fuel available for delivery to the engine, among others. For example, the control system may be configured to infer a composition of one or more fuels that are delivered to the engine in response to feedback received from exhaust gas sensor 126. As one example, the control system can identify a relative amount of each fuel type delivered to the engine via one or more fuel injectors based on the pulse-width provided by their respective drivers (e.g. drivers 164 and 166), and can identify the amount of air supplied to the engine via one or more of sensors 118, 120, 122, etc. The amount of air and fuel delivered to the engine can be compared to the feedback received from exhaust gas sensor 126 to infer the resulting composition of fuel based on a known relationship of the combustion characteristics of each fuel type that is delivered to the engine for a given air and fuel ratio. As one example, the control system may reference a suitable function, look-up table, or map stored in memory to identify fuel composition from a given air fuel ratio obtained from exhaust gas sensor 126. Furthermore, in some embodiments, the composition of one or more fuels that are available to the fuel delivery system may be identified by a fuel composition sensor as will be described in greater detail with reference to FIG. 9.

Control system 12 can also be configured to respond to the operating condition information received by the various sensors by adjusting one or more operating parameters of the engine and its associated fuel delivery system. As one example, the control system may be configured to increase or decrease the engine output in response to an indication of pedal position received from pedal position sensor 134. The control system may be configured to vary the amount of fuel delivered to the engine via fuel injectors 160 and 162 by adjusting a fuel injector pulse-width provided by respective drivers 164 and 166. The control system can vary the spark timing provided to each cylinder via ignition system 170. The control system can vary the valve timing of the intake and exhaust valves by any suitable variable valve actuation system including one or more of EVA, variable cam timing, variable valve lift, valve deactivation, etc. The control system can adjust the level of boosted intake air provided to the engine by adjusting an operating parameter of the compressor and/or turbocharger. For example, the control system can adjust the position of bypass valve 188 of turbine 182 and/or adjust a variable geometry component of turbine 182. In other examples, the control system can be configured to adjust the position of a compressor bypass valve and/or a variable geometry component of the compressor to adjust the level of boosted intake air delivered to the engine. Further still, the control system can adjust throttle position via electronic throttle control. Additionally, control system 12 may be configured to adjust one or more operating parameters associated with the fuel delivery system of the engine as will be subsequently described in greater detail, including adjusting the operation of various fuel pumps and valves. These and other operating parameters may be adjusted in response to user input received, for example, by pedal position sensor 134 and/or ambient conditions such as air temperature and pressure, among others.

Figure 2:
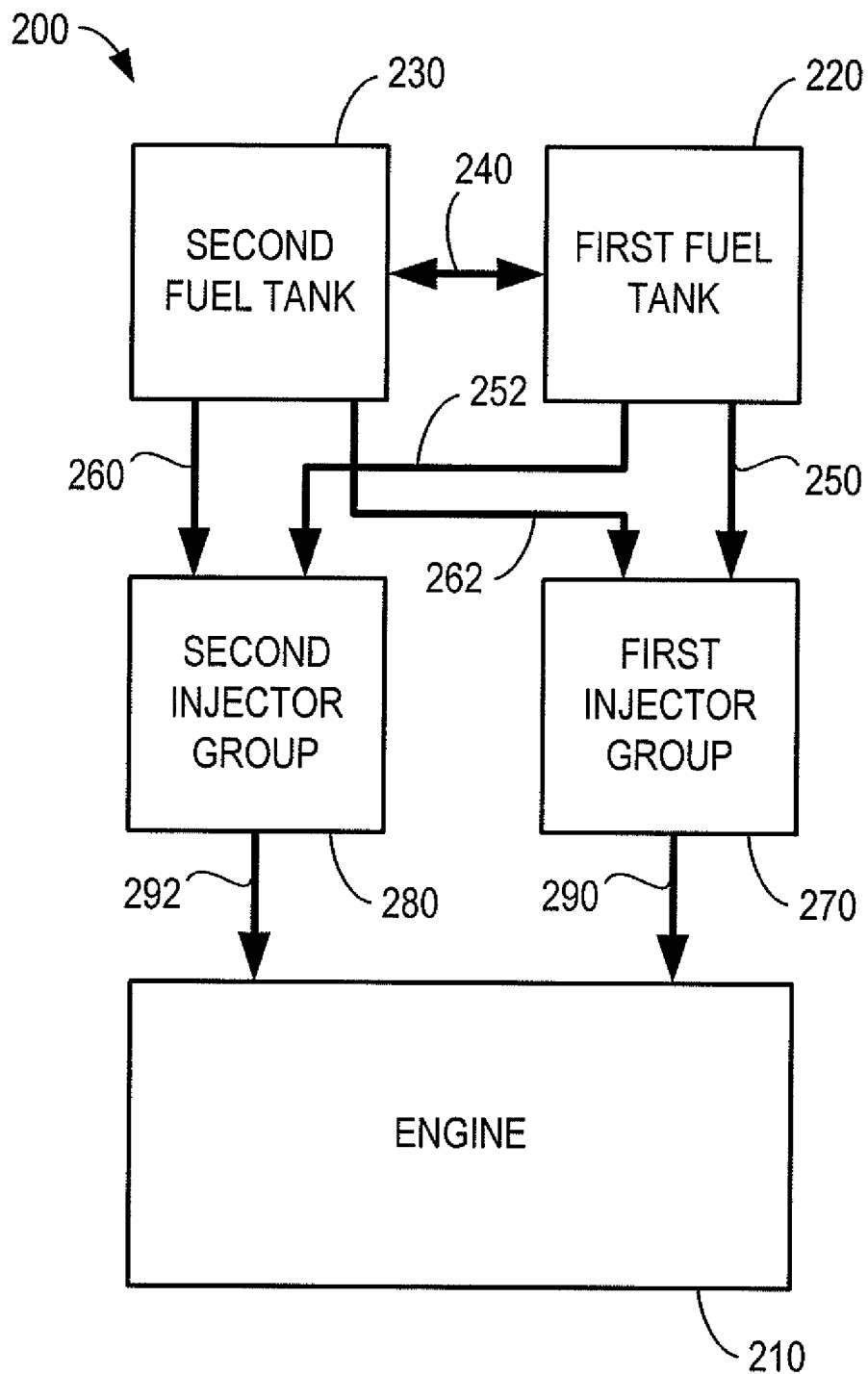
FIG. 2 schematically depicts a fuel delivery system that may be used with the engine of FIG. 1.

FIG. 2 schematically depicts an example embodiment of a fuel delivery system 200. More specific examples of fuel delivery system 200 will be described in greater detail with reference to fuel delivery systems 900, 1000, 1100, and 1200. Fuel delivery system 200 may be operated to deliver fuel to an engine 210. As a non-limiting example, Engine 210 can include any suitable fuel burning engine, and may refer to engine 10 as previously described with reference to FIG. 1, for example.

Fuel delivery system 200 can provide fuel to engine 210 from one or more different fuel sources. For example, in at least some embodiments, a first fuel storage tank 220 and a second fuel storage tank 230 may be provided. While fuel storage tanks 220 and 230 are described in the context of discrete vessels for storing fuel, it should be appreciated that these fuel storage tanks may instead be configured as a single fuel storage tank having separate fuel storage regions that are separated by a wall or other suitable membrane. Further still, in some embodiments, this membrane may be configured to selectively transfer select components of the fuel between the two or more fuel storage regions, thereby enabling a fuel mixture to be at least partially separated by the membrane into a first fuel at the first fuel storage region and a second fuel at the second fuel storage region.

In some examples, fuel storage tank 220 may contain a first fuel having a different composition than a second fuel contained in fuel storage tank 230. As a non-limiting example, the second fuel contained in fuel storage tank 230 may include a higher concentration of one or more components that provide the second fuel with a greater relative knock suppressant capability than the first fuel.

By way of example, the first fuel and the second fuel may each include one or more hydrocarbon components, but the second fuel may also include a higher concentration of an alcohol component than the first fuel. Under some conditions, this alcohol component can provide knock suppression when at engine 210 when delivered in a suitable amount relative to the first fuel, and may include any suitable alcohol such as ethanol, methanol, etc. Since alcohol can provide greater knock suppression than some hydrocarbon based fuels, such as gasoline and diesel, due to the increased latent heat of vaporization and charge cooling capacity of the alcohol, a fuel containing a higher concentration of an alcohol component can be selectively used to provide increased resistance to engine knock during select operating conditions.

As a specific non-limiting example, the first fuel may include gasoline and the second fuel may include ethanol. As another non-limiting example, the first fuel may include gasoline and the second fuel may include a mixture of gasoline and ethanol, where the second fuel includes a higher concentration of the ethanol component than the first fuel, thereby making the second fuel a more effective knock suppressant than the first fuel. In other examples, the first fuel and the second fuel may each include gasoline and ethanol, whereby the second fuel includes a higher concentration of the ethanol component than the first fuel. As yet another example, the second fuel may have a relatively higher octane rating than the first fuel, thereby making the second fuel a more effective knock suppressant than the first fuel. It should be appreciated that these examples should be considered non-limiting as other suitable fuels may be used that have relatively different knock suppression characteristics.

Fuel may be delivered to engine 210 from one or more of fuel storage tanks 220 and 230 by one or more fuel injectors. As previously described with reference to FIG. 1, an engine may include one or more of direct fuel injectors and port fuel injectors. In this way, fuel may be delivered to different locations of the engine relative to each of the engine's cylinders. As a non-limiting example, a first injector group 270 may include the engine's port fuel injectors while a second injector group 280 may include the engine's direct fuel injectors. However, in other examples, first injector group 270 may refer to a first direct fuel injector per each engine cylinder while second injector group 280 may refer to a second direct fuel injector per each engine cylinder. As yet another example, first injector group 270 may refer to a first port fuel injector per each engine cylinder while second injector group 280 may refer to a second port fuel injector per each engine cylinder.

In some embodiments of the fuel delivery system, fuel may be provided to fuel injector group 270 from fuel storage tank 220 as indicated at 250 where it may delivered to engine 210 as indicated at 290. In some embodiments, fuel may be additionally or alternatively provided to fuel injector group 280 from fuel storage tank 220 as indicated at 252 where it may delivered to engine 210 as indicated at 292. In this way, a first fuel may be selectively delivered to each cylinder of engine 210 from fuel storage tank 220 via one or more different fuel injectors.

Furthermore, in some embodiments of the fuel delivery system, fuel may be provided to fuel injector group 280 from fuel storage tank 230 as indicated at 260 where it may delivered to engine 210 as indicated at 292. In some embodiments, fuel may be alternatively or additionally provided to fuel injector group 270 from fuel storage tank 230 as indicated at 262 where it may delivered to engine 210 as indicated at 290. In this way, fuel may be selectively delivered to each cylinder of engine 210 from fuel storage tank 230 via one or more different fuel injectors.

Further still, in some embodiments, fuel may be selectively transferred between fuel storage tank 220 and fuel storage tank 230. As one example, at least a portion of a first fuel contained in fuel storage tank 220 may be transferred to fuel storage tank 230, where it may be mixed with a second fuel contained in fuel storage tank 230. The transfer of the first fuel from fuel storage tank 220 to fuel storage tank 230 may potentially change the composition of the second fuel contained in fuel storage tank 230 where the first fuel and the second fuel initially have different compositions.

For example, where the second fuel includes a higher concentration of a knock suppressing component than the first fuel, a transfer of fuel between the fuel storage tanks may create a resulting fuel mixture having a relatively higher or lower concentration of the knock suppressing component in the fuel storage tank that is receiving the transferred fuel. Similarly, where the second fuel includes a higher octane rating than the first fuel, a transfer of fuel between the fuel storage tanks may create a resulting fuel mixture having a relatively higher or lower octane rating in the fuel storage tank that is receiving the transferred fuel.

Further still, as will be described with reference to FIG. 12, fuel rails associated with the fuel injectors may be selectively flushed in some conditions by replacing a fuel contained in the fuel rail with a different fuel. As one example, this approach may be used in preparation for a starting of the engine (e.g. at key-off or key-on) to provide the better starting fuel to the appropriate fuel injectors, including higher volatility fuels such as gasoline, methane, or a heated fuel.

Referring also to FIG. 3, an example process flow will be described with reference to fuel delivery system 200. It should be appreciated that the process flow of FIG. 3 can be executed by control system 12 and may be utilized in conjunction with the specific embodiments of the fuel delivery system described herein with reference to FIGS. 8-12.

At 310, operating conditions may be assessed for the engine and associated fuel delivery system. For example, control system 12 can receive an indication of operating conditions from one or more of the sensors previously described with reference to engine 10 of FIG. 1 and the various sensors associated with fuel delivery systems 900, 1000, 1100, and 1200. As a non-limiting example, the control system can identify the relative and/or absolute amount of each fuel that is stored on-board the vehicle (e.g. in one or more of the fuel storage tanks) and a corresponding fuel composition for each fuel that is available for delivery to the engine. For example, the control system can identify fuel composition from one or more fuel composition sensors or from feedback from an exhaust gas composition sensor (e.g. an exhaust oxygen sensor) for a given air charge and fuel delivery amount. Further, the control system can identify the engine speed and engine load responsive to input received from the previously described sensors, including sensors 118, 120, and 122.

At 312, it may be judged whether fuel is to be transferred from a first fuel storage tank to a second fuel storage tank. For example, it may be judged whether to transfer fuel from fuel storage tank 220 to fuel storage tank 230. If the answer at 312 is judged yes, at 314, a fuel transfer from the first fuel storage tank to the second fuel storage tank may be performed. The process flow may proceed to 320 from 314.

Alternatively, if the answer at 312 is judged no, at 316, it may be judged whether fuel is to be instead transferred from the second fuel storage tank to the first fuel storage tank. For example, it may be judged whether to transfer fuel from fuel storage tank 230 to fuel storage tank 220. If the answer at 316 is judged yes, at 318, a fuel transfer from the second fuel storage tank to the first fuel storage tank may be performed. The process flow may proceed to 320 from 318. Alternatively, if the answer at 316 is judged no, the process flow may proceed to 320.

At 320, it may be judged whether fuel is to be delivered to the engine from the first fuel storage tank via a first group of fuel injectors. For example, it may be judged whether fuel is to be delivered to engine 210 by one or more fuel injectors associated with first fuel injector group 270. If the answer at 320 is judged yes, at 322, fuel may be delivered to the engine from the first fuel storage tank via one or more fuel injectors of the first fuel injector group. The process flow may proceed to 324 from 322.

Alternatively if the answer at 320 is judged no, at 324, it may be judged whether fuel is to be delivered to the engine from the first fuel storage tank via one or more fuel injectors of a second fuel injector group. For example, it may be judged whether fuel is to be delivered to engine 210 by one or more fuel injectors of second injector group 280. If the answer at 324 is judged yes, at 326, fuel may be delivered to the engine from the first fuel storage tank via the second fuel injector group. Therefore, in at least some examples, fuel from a first fuel storage tank may be selectively provided to each cylinder of the engine via one or more fuel injectors of two different fuel injectors groups. From 326, the process flow may proceed to 328. Alternatively, if the answer at 324 is judged no, the process flow may proceed to 328.

At 328, it may be judged whether fuel is to be delivered to the engine from the second fuel storage tank via the second group of fuel injectors. For example, it may be judged whether fuel is to be delivered to engine 210 by one or more fuel injectors of second fuel injector group 280. If the answer at 328 is judged yes, at 330, fuel may be delivered to the engine from the second fuel storage tank via the second fuel injector group. The process flow may proceed to 332 from 330.

Alternatively if the answer at 328 is judged no, at 332, it may be judged whether fuel is to be delivered to the engine from the second fuel storage tank via one or more fuel injectors of the first fuel injector group. For example, it may be judged whether fuel is to be delivered to engine 210 by first injector group 270. If the answer at 332 is judged yes, at 334, fuel may be delivered to the engine from the second fuel storage tank via the first fuel injector group. Therefore, in at least some examples, fuel from a second fuel storage tank may be provided to each cylinder of the engine via two different injectors groups in addition to or as an alternative to fuel provided to the engine from the first fuel storage tank. From 334 and 332 the process flow may return.

While the process flow of FIG. 3 has been described with reference to fuel delivery system 200, it should be appreciated that the process flow of FIG. 3 may be used with the subsequently described embodiments 900, 1000, 1100, and 1200 of fuel delivery system 200. Similarly, the process flows of FIGS. 4, 5, and 8 may be utilized in conjunction with the various embodiments of fuel delivery system. However, it should be appreciated that these process flows are not necessarily limited to the specific embodiments of the fuel delivery system described herein, but may be utilized with other embodiments of the fuel delivery system where appropriate.

Figure 4A:
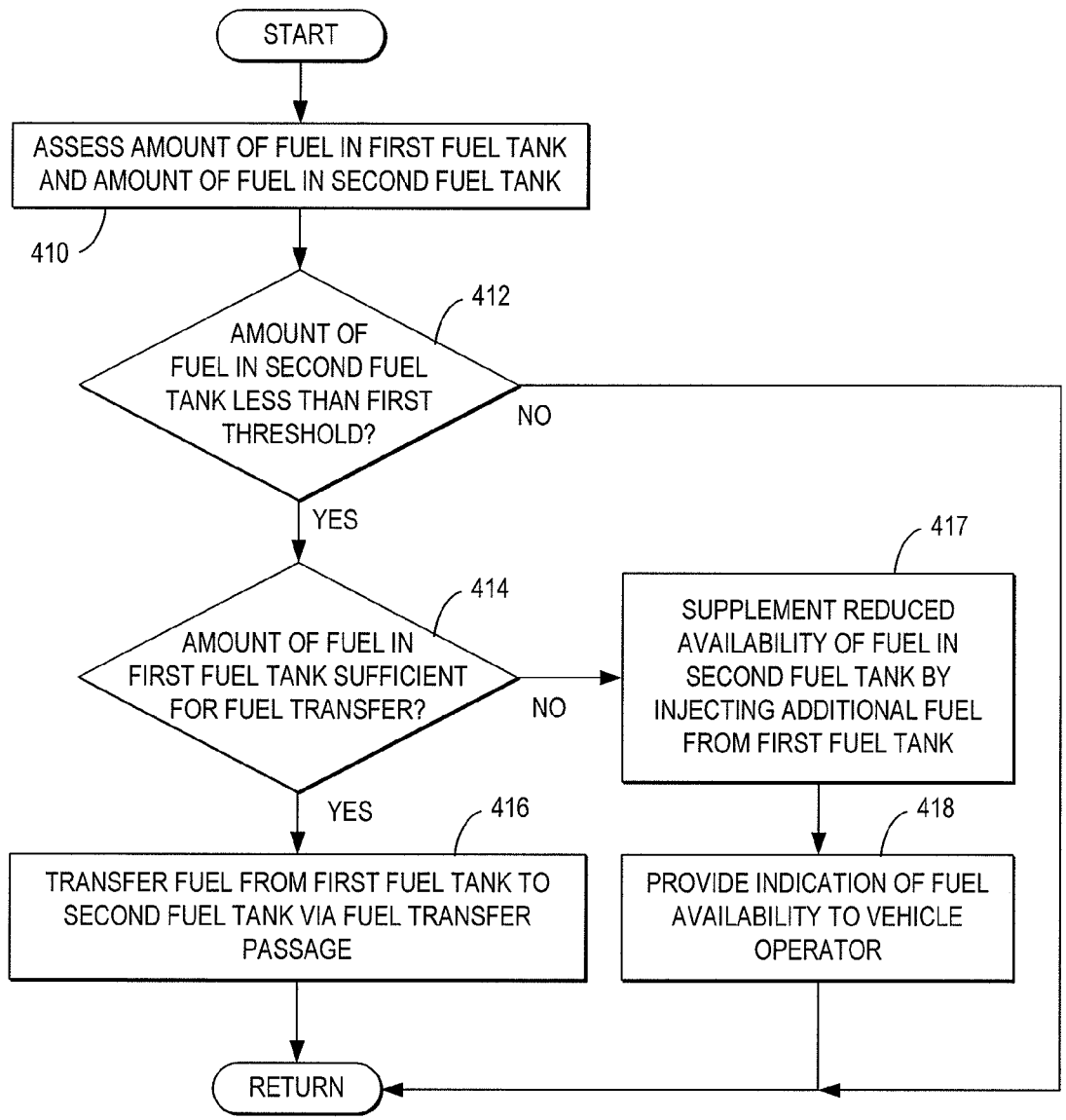

Referring to FIG. 4A, an example process flow is described that may be used in conjunction with the fuel transfer operations previously described by the process flow at 310-318 of FIG. 3. At 410 an amount of fuel stored in a first fuel storage tank and an amount of fuel stored in a second fuel storage tank may be assessed. As a non-limiting example, control system 12 can assess the amount of fuel stored in each fuel storage tank in response to input received from a fuel level sensor associated with each fuel storage tank. For example, fuel level sensors 926 and 936, described with reference to fuel system 900 of FIG. 9, can provide an indication to control system 12 of the amount of fuel contained in each of a first and second fuel storage tank. It should be appreciated that in other embodiments, the control system may be configured to assess the amount of fuel in each fuel storage tank in response to input received from other suitable sensors, including fuel mass sensors, fuel volume sensors, fuel pressure sensors, etc.

At 412, if the amount of fuel contained in the second fuel storage tank (e.g. fuel storage tank 230) is less than a first threshold amount, then the process flow may proceed to 414. As one example, the control system may compare the amount of fuel contained in the second fuel storage tank to the first threshold amount stored in memory. However, in other examples, the control system may identify the threshold amount in response to the assessed operating conditions as directed by any suitable function, look-up table, or map stored in memory.

At 414, if a fuel transfer is to be initiated from the first fuel storage tank to the second fuel storage tank, then the process flow may proceed to 416. As a non-limiting example, the control system may compare the amount of fuel contained in the first fuel storage tank to a second threshold amount indicative of whether there is sufficient fuel in the first fuel storage tank to initiate a fuel transfer. As previously described with regards to the first threshold amount identified at 412, the control system may reference memory to obtain the second threshold amount, or may utilize any suitable function, look-up table, or map stored in memory to obtain the second threshold amount for purposes of comparison to the amount of fuel stored in the first fuel storage tank as identified at 410.

In still other examples, the operation at 414 may be omitted, whereby the control system may selectively transfer some or all of the fuel from the first fuel storage tank to the second fuel storage tank so that the first fuel storage tank is emptied before the second fuel storage tank. In this way, fuel may be available to the direct fuel injectors coupled with the second fuel storage tank thereby enabling cooling of the direct fuel injectors by direct injection of fuel from the second fuel storage tank to continue.

At 416, fuel may be transferred from the first fuel storage tank to the second fuel storage tank via at least one fuel transfer passage fluidly coupling the first fuel storage tank and the second fuel storage tank. For example, with reference to fuel delivery system 200, fuel may be transferred between two fuel storage tanks as indicated at 240. As will be described in greater detail with reference to fuel delivery systems 900, 1000, 1100, and 1200, the fuel transfer between two fuel storage tanks may be effectuated by a variety of different fuel transfer passages, and may include the operation of one or more fuel pumps and valves to facilitate the fuel transfer. As such, the control system can be configured to operate one or more fuel pumps and valves in accordance with the process flow of FIGS. 4A and/or 4B in order to perform the prescribed fuel transfer. From 416, the process flow may return.

Alternatively, if the answer at 414 is judged no, then the process flow may proceed to 417. At 417, delivery to the engine of fuel from the second fuel storage tank can be supplemented or replaced with increased delivery of fuel from the first fuel storage tank. For example, with reference to fuel delivery system 200, an amount of fuel provided to the engine from the first fuel storage tank can be increased relative to an amount of fuel provided to the engine from the second fuel storage tank. In this way, the usage of fuel from the second fuel storage tank can be reduced, thereby conserving the fuel stored in the second fuel storage tank.

As a non-limiting example, the control system can increase the amount of a first fuel that is delivered to the engine from the first fuel storage tank relative to an amount of a second fuel that is delivered to the engine from the second fuel storage tank by increasing delivery of the first fuel via one or more of fuel paths 250 and 252. For example, the control system can increase the flow rate of the first fuel to one or more of the first and the second fuel injector groups, while reducing the flow rate of the second fuel. In some embodiments, the operation at 417 can be provided at 416 in addition to the transfer of fuel from the first fuel storage tank to the second fuel storage tank. Further, in some embodiments, the fuel transfer operation at 416 may be replaced with the operation described at 417.

At 418, an indication of fuel availability may be provided to the vehicle operator. As one example, the control system may provide a user perceivable visible or aural output to the vehicle operator that indicates that the amount of fuel contained in the second fuel storage tank is less than the first threshold amount as judged at 412. Additionally or alternatively, the control system may provide a user perceivable visible or aural output to the vehicle operator that indicates that the amount of fuel contained in the second fuel storage tank is insufficient to initiate a fuel transfer to the second fuel storage tank as judged at 414. Note that the indication provided at 418 may be in addition to other indications of fuel availability that may be provided to the vehicle operator. For example, the indication provided at 418 may supplement other fuel level indications that are provided to the vehicle operator in response to input received from fuel level sensors. In this way, the control system can notify the vehicle operator that a fuel transfer has not or cannot been performed by the fuel delivery system. From 412, 416, and 418, the process flow can return.

Figure 4B:
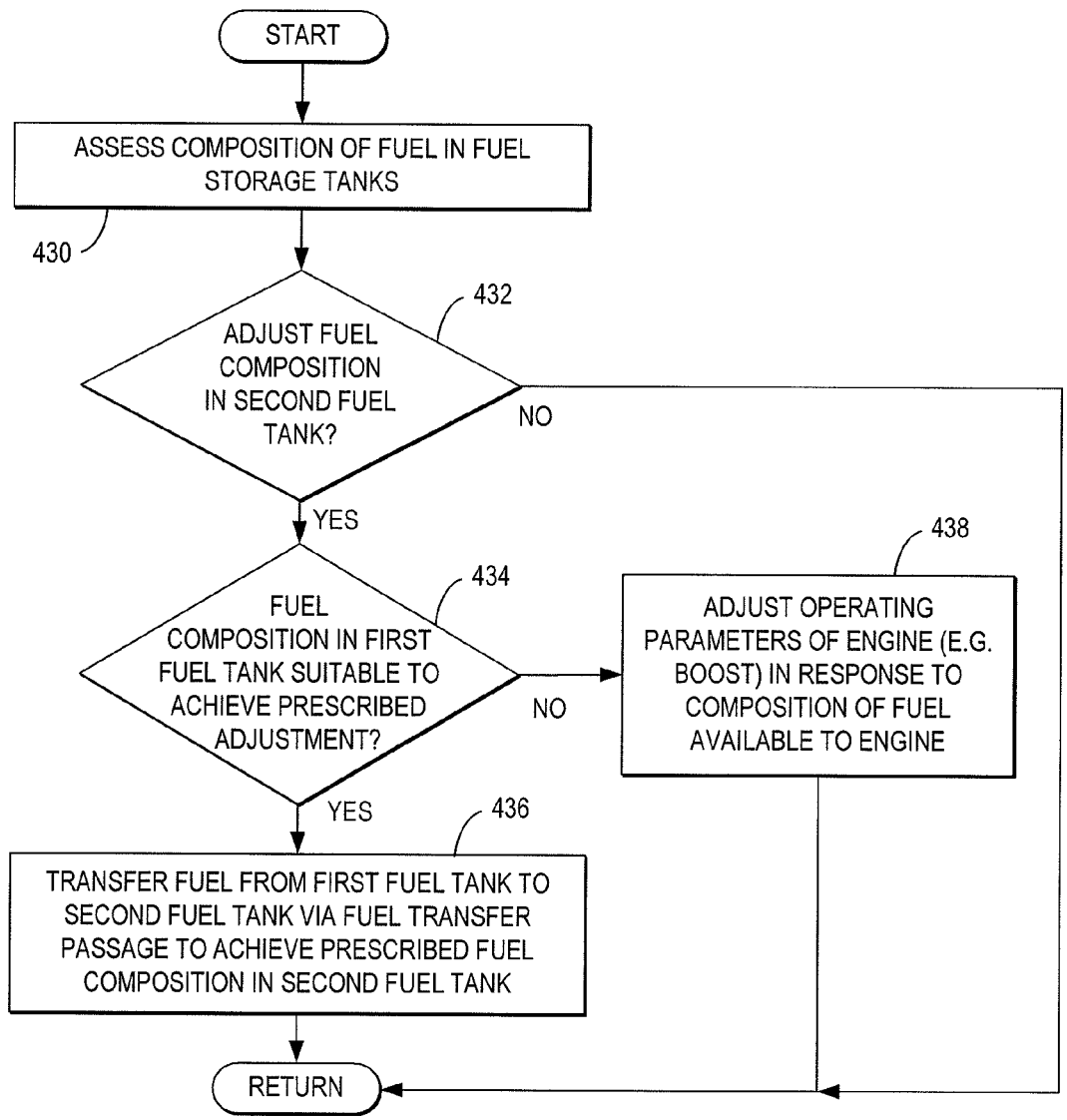
Figure 15:
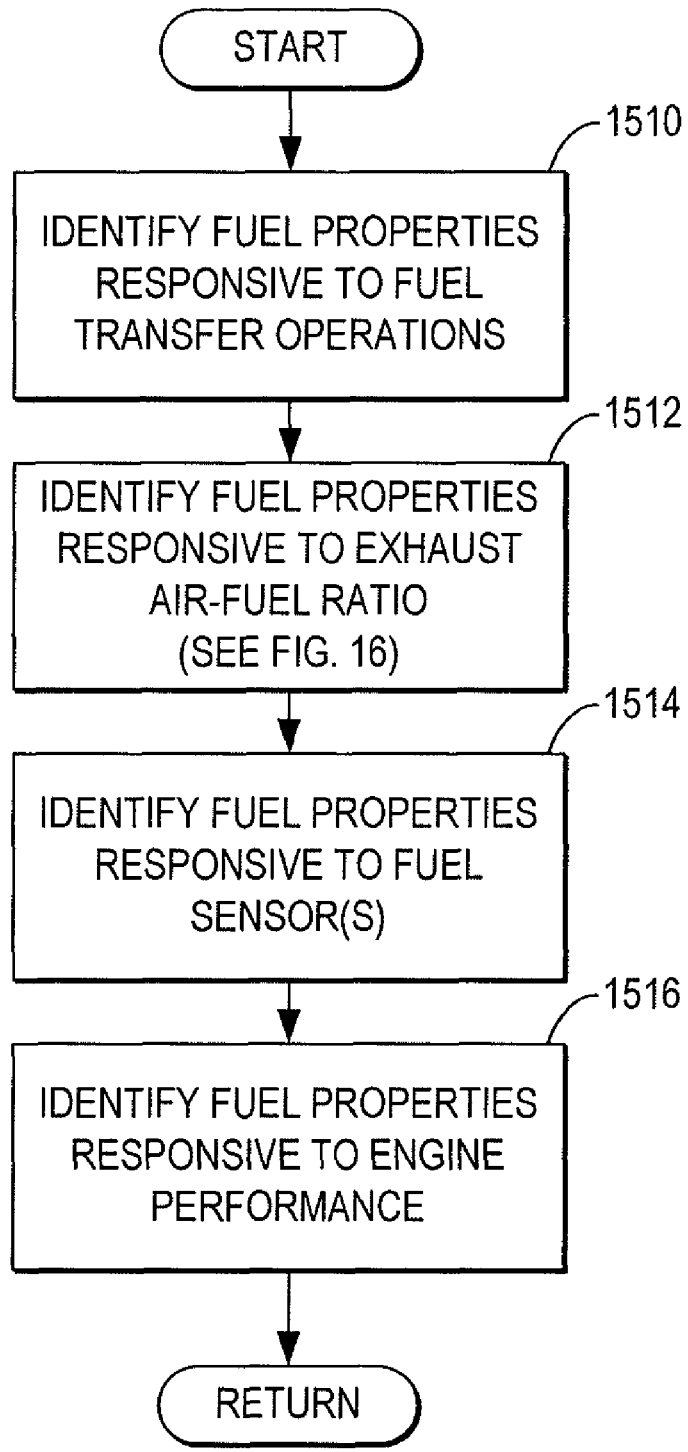
FIGS. 15 and 16 depict example process flows for identifying properties of one or more fuels stored on-board the vehicle.
Figure 16:
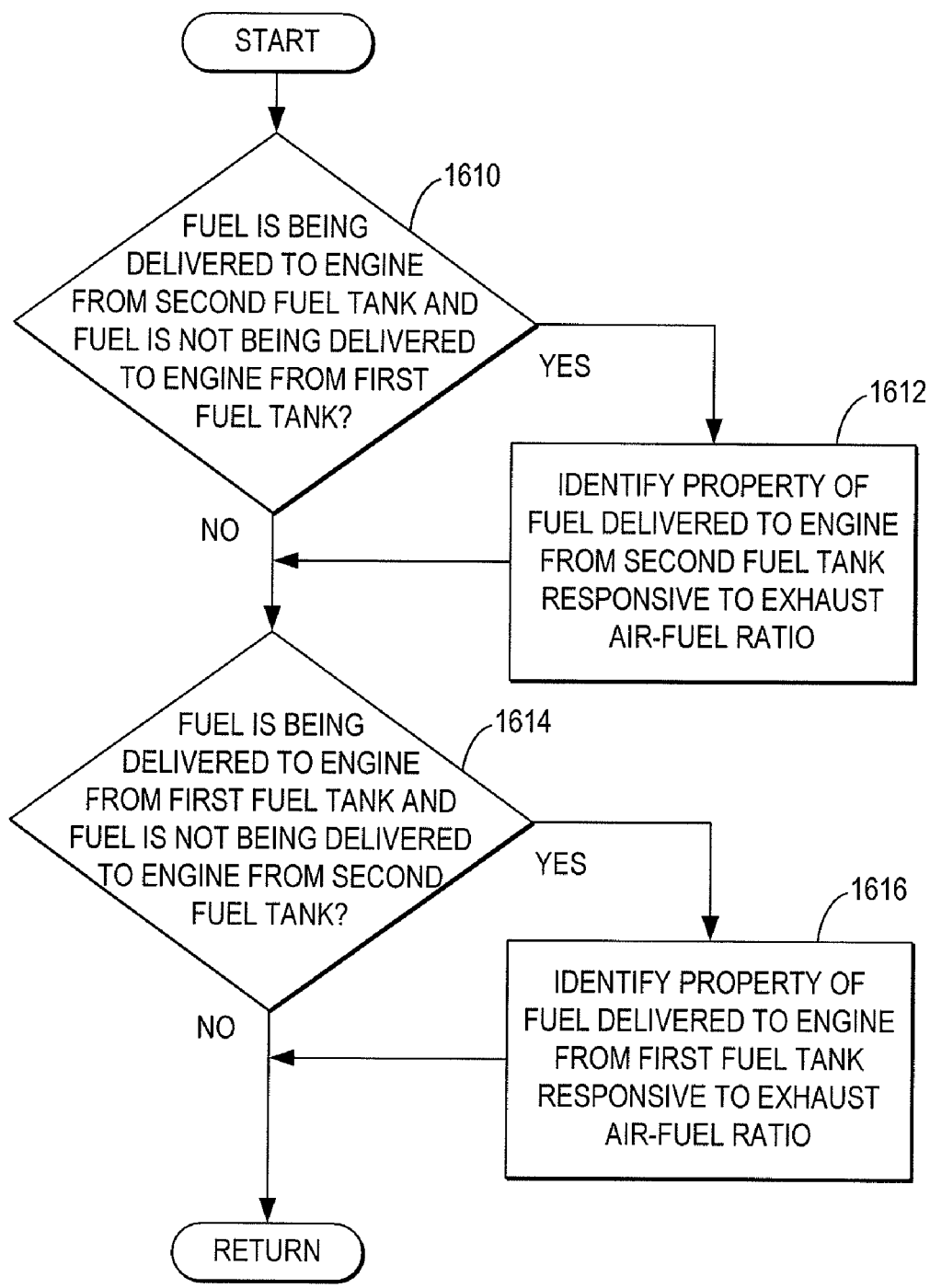

Referring to FIG. 4B, a second example process flow is described that may be used in conjunction with the fuel transfer operations previously described by the process flow at 310-318 of FIG. 3. At 430, the control system may assess a property (e.g. composition, knock suppression capability, etc.) of one or more of the fuels in the fuel storage tanks. As one example, the control system can identify or infer a composition or concentration of a fuel component (e.g. alcohol) or an octane rating of the fuel contained in the second fuel storage tank via feedback from an exhaust gas sensor and/or sensors 946, 948, etc. Additionally, the control system can identify or infer a composition or concentration of a fuel component or an octane rating of the fuel contained in the first fuel storage tank. FIGS. 15 and 16 illustrate a process flow that may be performed by the control system to identify one or more of these fuel properties.

At 432 it may be judged whether the fuel composition identified at 430 is to be adjusted. As one example, the control system may be configured to maintain a target fuel composition in one or more of the fuel storage tanks. For example, the control system may be configured to maintain a target concentration or concentration range for a particular fuel component (e.g. alcohol) or a prescribed octane rating or octane range for the fuel contained in the second fuel storage tank. In some embodiments, these target ranges may be selected by the control system in response to operating conditions or learned knock frequency or intensity over previous drive cycles. For example, operating conditions such as minimum and/or maximum fuel injector pulse-width of the direct fuel injector may be considered as well as fuel pressure settings at the direct fuel injectors, a level of boost provided to the engine, engine speed, engine load, and ambient conditions, among others. As a non-limiting example, the control system may be configured to maintain a concentration of ethanol in the fuel contained in the second fuel storage tank between 80% and 90%, under some operating conditions. However, in other examples, the target range or fuel composition value may be fixed.

If the answer at 432 is judged no, the process flow can return. For example, if the control system judges that the fuel composition in the second fuel storage tank is within the prescribed range then the process flow may return. Alternatively, if the fuel composition in the second fuel storage tank is to be adjusted, then the process flow may proceed to 434. For example, where the composition of the fuel stored in the second fuel storage tank is outside of the target fuel composition range identified by the control system or if the fuel composition deviates substantially from a target fuel composition, the process flow may proceed to 434.

At 434, it may be judged whether the composition of fuel contained in the first fuel storage tank is suitable for achieving the prescribed fuel composition adjusted in the second fuel storage tank. For example, the control system can judge whether a fuel transfer from the first fuel storage tank to the second fuel storage tank will serve to adjust the fuel composition of the second fuel storage tank to a value that is within or closer to the target fuel composition range or target fuel composition value. As a non-limiting example, if the fuel contained in the second fuel storage tank is identified as having an ethanol concentration of 95% and the target fuel composition range for the second fuel storage tank is between 80% and 90%, the control system may judge whether the fuel contained in the first fuel storage tank has an ethanol concentration that is less than at least 95% or some other suitable value. For example, where the fuel contained in the first fuel storage tank is substantially gasoline, the control system will judge the answer at 434 to be yes, since a transfer of at least some of the gasoline to the second fuel storage tank can serve to reduce the concentration of ethanol in the second fuel storage tank.

If the answer at 434 is yes, the process flow may proceed to 436 where fuel may be transferred from the first fuel storage tank to the second fuel storage tank to achieve the prescribed target fuel composition at the second fuel storage tank. For example, the control system can transfer sufficient gasoline from the first fuel storage tank to the second fuel storage tank that creates a resulting fuel mixture in the second fuel storage tank that has a concentration of ethanol that is within or closer to the target fuel composition range.

Alternatively, if the answer at 434 is judged no, the process flow may proceed to 438. At 438, the control system may adjust one or more operating parameters of the engine in response to the composition of the various fuels that are available to the engine. For example, the control system can adjust boost provided by a turbocharger or supercharger in response to a concentration of ethanol or other component in the fuel contained in the second fuel storage tank. From 432, 438, and 436, the process flow may return.

As described with reference to FIG. 4B, the control system can be configured to adjust the composition of fuel in one or more of the fuel storage tanks by transferring fuel between one or more of the fuel storage tanks. As a non-limiting example, the control system may be configured to identify a minimum concentration of a fuel component or a minimum octane rating that can be used to achieve a prescribed level of knock suppression at the engine. The control system may then dilute the fuel contained in the second fuel storage tank (e.g. the fuel tank coupled with the direct fuel injectors such as fuel storage tank 930) to the minimum concentration or octane rating need to achieve the prescribed level of knock suppression at the engine by transferring a fuel having a lower concentration or octane rating to the second fuel storage tank. In this way, the control system can be configured to extend the availability of the knock suppressing fuel by diluting it to a suitable concentration of the knock suppressing component needed to achieve the desired level of knock suppression at the engine. For example, where a first fuel (e.g. gasoline) having a lower concentration of a knock suppressing component or octane rating is received at the first fuel storage tank and a second fuel (e.g. ethanol) having a higher concentration of the knock suppressing component or octane rating is received at the second fuel storage tank, the control system may be configured to dilute the second fuel by adding at least some of the first fuel to form a fuel mixture having a lower concentration of the knock suppressing component or octane rating than the second fuel yet higher than the first fuel.

It should be appreciated that the process flow of FIGS. 4A and 4B have been described with reference to a fuel transfer from the first fuel storage tank to the second fuel storage tank. In other examples, this process flow can also be executed by the control system to transfer fuel from the second fuel storage tank to the first fuel storage tank in response to operating conditions identified by the control system, including the relative amount of fuel stored in each of the fuel storage tanks and/or fuel composition.

Figure 5:
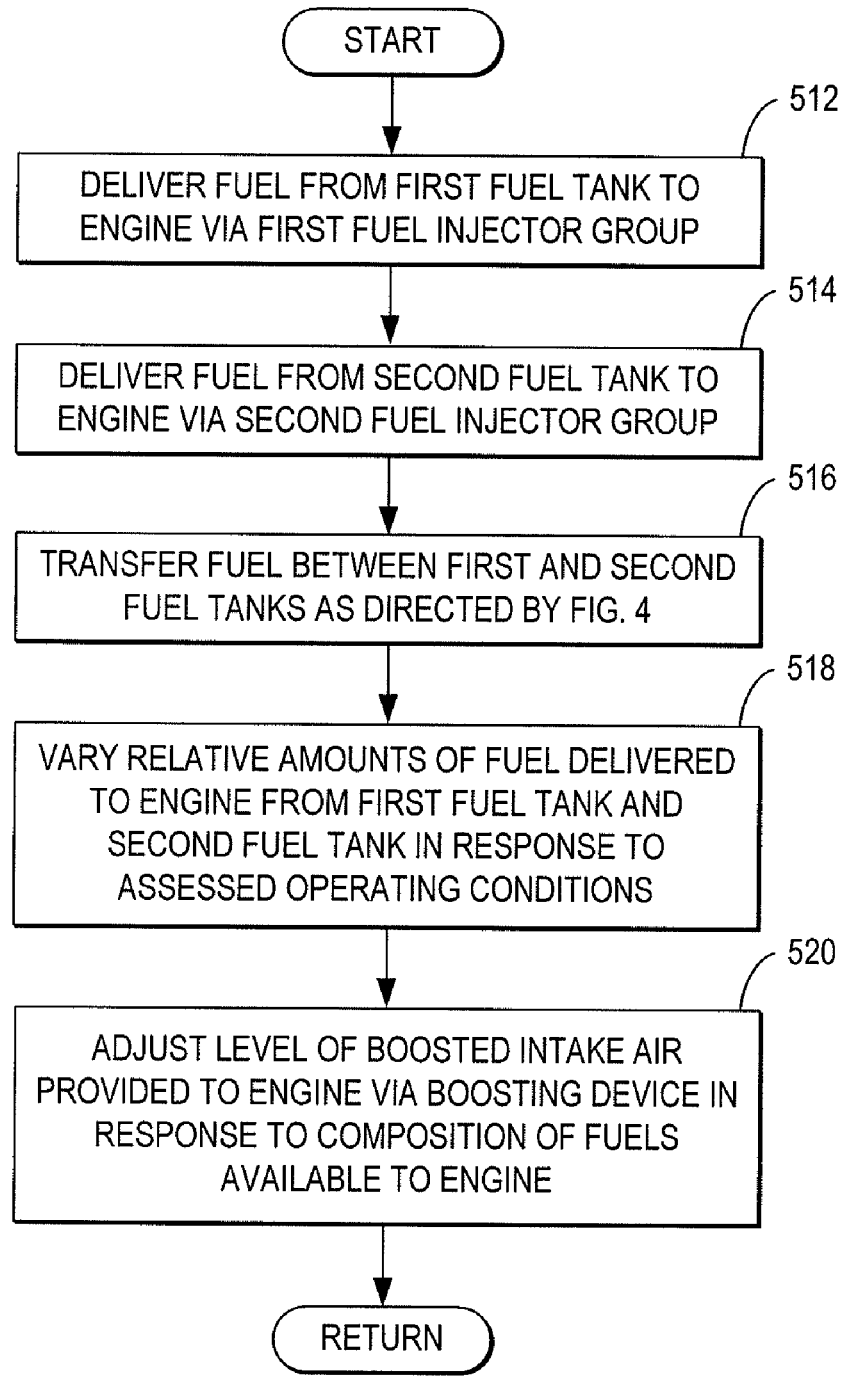

Referring now to FIG. 5, an example process flow is described which may be used to adjust one or more operating parameters of the engine in response to one or more of the operating conditions identified at 310. At 512, a first fuel from the first fuel storage tank may be delivered to the engine via one or more fuel injectors of a first fuel injector group. As one example, the control system can operate fuel injector 160 of fuel injector group 270 via driver 164 to deliver fuel to intake passage 44 of combustion chamber 30.

At 514, fuel from the second fuel storage tank may be delivered to the engine via at least a second fuel injector group. For example, the control system can operate fuel injector 162 of fuel injector group 280 via driver 166 to deliver fuel directly to combustion chamber 30. Referring also to fuel delivery system 200, this particular fuel delivery mode corresponds to fuel delivery paths 250 and 290 for the first fuel contained in fuel storage tank 220 and fuel delivery paths 260 and 292 for the second fuel contained in fuel storage tank 230.

At 516, fuel can be transferred between the first fuel storage tank and the second fuel storage tank as previously described with reference to the process flow of FIG. 4A. As will be further described with reference to the fuel delivery mode table of FIG. 13, fuel may be delivered to the engine from one or more of the fuel storage tanks while fuel is concurrently transferred between two of the fuel storage tanks. As such, it should be appreciated that the operations described with reference to 512, 514, and 516 can be performed concurrently in at least some examples. However, in other examples, fuel may be transferred between two fuel storage tanks while fuel delivery to the engine from one or more of the fuel storage tanks is discontinued.

At 518, the relative amounts of fuel delivered to the engine from the first fuel storage tank and the second fuel storage tank can be varied in response to the operating conditions assessed at 310. As a non-limiting example, the first and second fuel storage tanks may include different fuels, whereby the fuel contained by the second fuel storage tank has a greater concentration of a knock suppressing component (e.g. an alcohol) and/or may have a higher octane rating than the fuel contained by the first fuel storage tank.

Figure 6A:
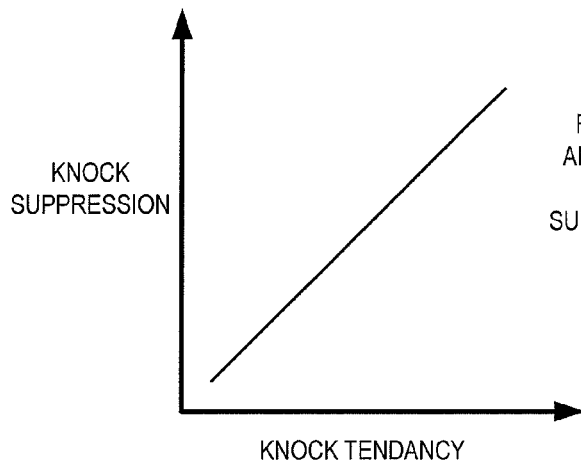
FIGS. 6 and 7 are graphs depicting example relationships that may be maintained by the control system.
Figure 6B:
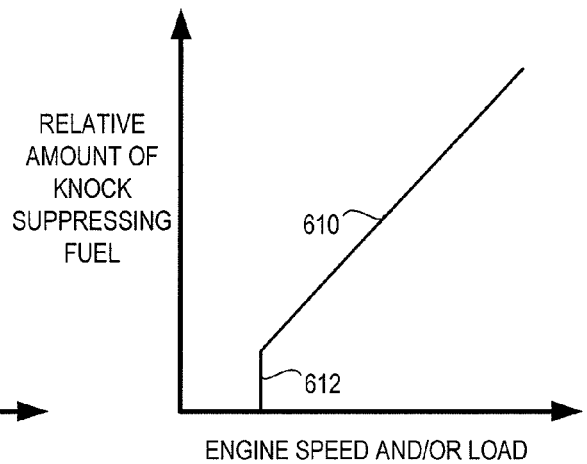

Referring also to FIGS. 6 and 7, as indicated by FIG. 6A, a level of knock suppression may be increased by the control system with an increasing knock tendency in order to reduce or eliminate the occurrence or likelihood of engine knock. In accordance with this approach, an amount of a knock suppressing substance delivered to the engine by the fuel delivery system may be increased by the control system in response to increasing engine speed and/or engine load. For example, as indicated by FIG. 6B, a relative or absolute amount of a knock suppressing substance that is delivered to the engine may be increased in response to increasing engine speed and/or engine load as indicated by line 610. Additionally or alternatively, the control system may vary the location where each fuel is delivered to the engine in response to the identified operating conditions by selecting which group of fuel injectors is supplied with each fuel as will be described in greater detail with reference to fuel delivery systems 900, 1000, 1100, and 1200.

In some embodiments, during some lower engine speed and/or engine load conditions, the fuel having the greater concentration of the knock suppressing component may not be delivered to the engine or may be delivered to the engine in a lower amount relative to the other fuel. As indicated by line 610, at higher engine speed and/or load conditions, the amount of the fuel delivered to the engine containing the higher concentration of knock suppressing component may be increased relative to another fuel containing a lower concentration of the knock suppressing component. In some examples, this increase in the amount of a knock suppressing substance delivered to the engine may be accompanied by an initial step-wise increase as indicated at 612, which can arise as a consequence of the corresponding minimum pulse-width limitations of the fuel injectors.

As a non-limiting example, the fuel including the greater concentration of the knock suppressing component, such as an alcohol or a fuel having a higher octane rating, may be delivered to the engine cylinders by way of direct injection while a fuel having a lower concentration of the knock suppressing component may be delivered to the engine cylinders via port injection. In order to conserve the fuel having the greater concentration of the knock suppressing substance, the direct injection may be deactivated during some lower engine speed and/or load conditions. However, in some examples, the direct injectors may be periodically operated to inject at least some fuel in order to reduce or maintain the temperature of the direct injectors below a suitable temperature threshold.

Therefore, as indicated at 518, the amount of a first fuel delivered to the engine from the first fuel storage tank and the amount of the second fuel delivered to the engine from the second fuel storage tank may be varied relative to each other in response to the operating conditions assessed by the control system, including engine speed, engine load, and/or a level of boost provided by a boosting device. The control system may reference a suitable function, look-up table, or map stored in memory to control the fuel delivery in accordance with FIGS. 6A and 6B.

It should be appreciated that a relative increase in the amount of the knock suppressing fuel relative to the other fuel may include an absolute increase in an amount of each fuel delivered to the engine, with the amount of the knock suppressing fuel increasing to a greater extent than the other fuel. In other words, the total amount of fuel delivered to the engine may be increased, may be reduced, or may be held constant while the relative amounts of a first fuel and a second fuel that are delivered to the engine may be increased or decreased.

Figure 7A:
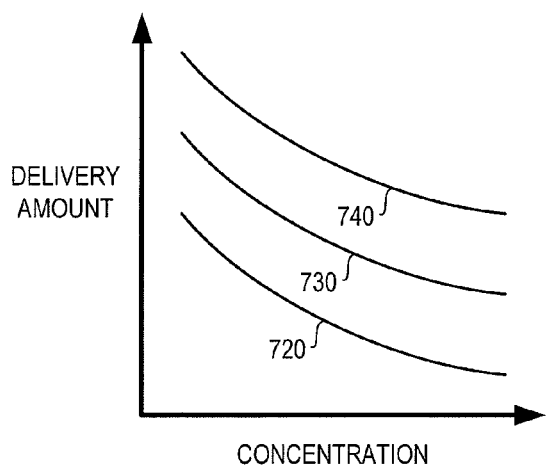

Referring also to FIG. 7A, a family of curves 720, 730, and 740 are depicted, which represent how fuel composition, as a concentration of the knock suppressing component in the fuel, can be used by the control system to adjust the amount of that fuel that is delivered to the engine. For example, curves 720, 730, and 740 can represent different engine operating conditions such as speed and/or load. Curves 720, 730, and 740 depict how the amount of the knock suppressing fuel delivered to the engine can vary inversely to the concentration of the knock suppressing component in the knock suppressing fuel for a given set of operating conditions.

As a non-limiting example, if a first fuel having a lower concentration of the knock suppressing component is transferred from a first fuel storage tank to a second fuel storage tank that contains a second fuel having a higher concentration of the knock suppressing component, then the resulting fuel mixture at the second fuel storage tank may have a lower concentration of the knock suppressing component than was initially contained in the second fuel.

As such, in some examples, the control system may increase the amount of the knock suppressing fuel that is delivered to the engine relative to the other fuel in order to achieve the same or similar level of knock suppression for a given set of operating conditions. However, in some conditions, the concentration of the knock suppressing substance may be too low and/or an upper limit on the amount of the knock suppressing fuel that can be delivered to the engine may have been attained for the given operating conditions. During these conditions, the likelihood or severity of engine knock may otherwise increase where it is impracticable to further increase delivery of the knock suppressing component.

At 520, a level of boosted intake air that is provided to the engine by the boosting device may be adjusted in response to one or more of the previous assessed operating conditions. As a non-limiting example, the control system may adjust the level of boost in response to an indication of a composition of one or more fuels. Note that fuel composition may be identified from one or more fuel composition sensors or may be inferred from feedback received from an exhaust gas sensor as previously described. Additionally or alternatively, the control system may adjust the level of boost in response to the relative amount of each fuel that is delivered to the engine and/or the location where each of the fuels are delivered to the engine (e.g. port injection or direct injection). Further still, it should be appreciated that the control system can be configured to adjust the level of boost in response to other operating conditions, including user input (e.g. received via pedal 130), engine speed, transmission gear, throttle position, etc.

Figure 7B:
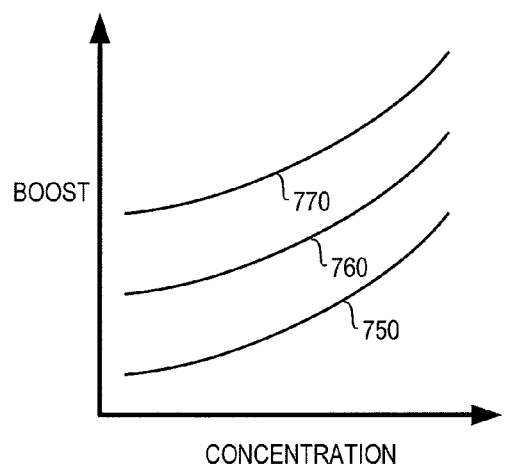

As a non-limiting example, the level of boost provided by the boosting device (e.g. via compressor 180) may be adjusted responsive to the concentration of the knock suppressing component (e.g. an alcohol or higher octane component) in one or more of the fuels. Referring also to FIG. 7B, as indicated by the family of curves at 750, 760, and 770, the level of boosted intake air may be reduced for lower concentrations of the knock suppressing component in the fuel and may be increased at higher concentrations of the knock suppressing component for a given set of operating conditions. For example, as a concentration of ethanol or other higher octane component decreases in a fuel mixture that is supplied to a direct fuel injector of the engine, the level of boost provided to the engine by the turbocharger may be reduced. Conversely, where the concentration of the knock suppressing component increases (e.g. in response to a refueling operation), the level of boost provided to the engine may be increased. Again, curves 750, 760, and 770 can correspond to different engine speed and/or engine load conditions, or may each represent a given level of knock suppression and/or knock severity. By adjusting engine boost according to the concentration of the knock suppressing component in the fuel, a suitable level of knock suppression may be achieved for a given set of operating conditions.

Figure 8:
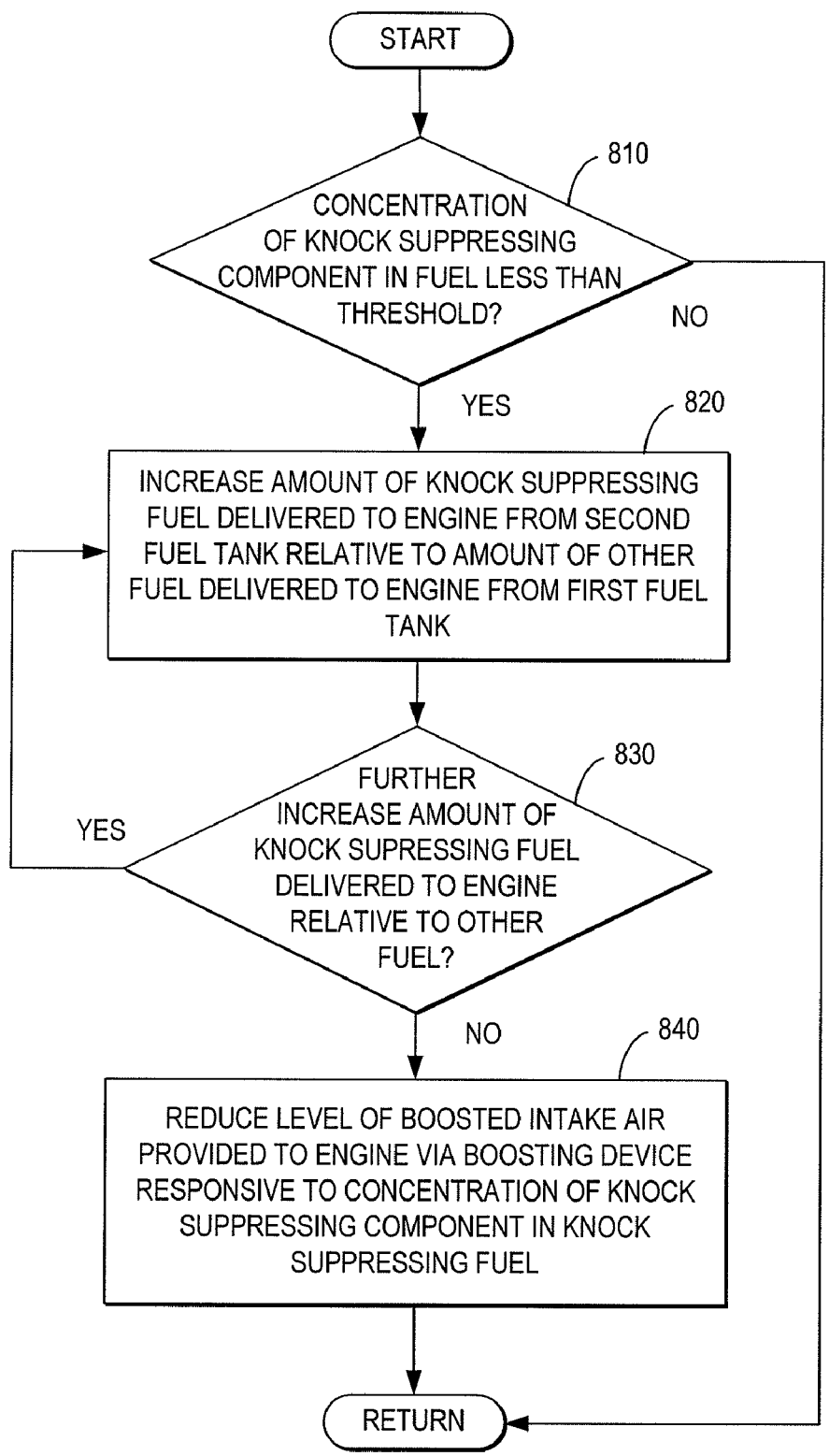
FIG. 8 provides an example process flow that may be performed by the control system for one or more of the fuel delivery systems described herein.

Referring to FIG. 8, a process flow depicting a non-limiting example of operation 520 is described. In this particular example, the fuel delivery system includes a first fuel storage tank containing a first fuel and a second fuel storage tank containing a second fuel, where the second fuel has a higher concentration of a knock suppressing component. At 810, it may be judged whether the concentration of the knock suppressing component in the second fuel is less than a threshold. For example, as will be described with reference to fuel delivery systems 900, 1000, 1100, and 1200, one or more fuel composition sensors may be used by the control system to identify a concentration of the knock suppressing substance in one or more of the fuels stored on-board the vehicle.

If the answer at 810 is judged no, the process flow may return. Alternatively, if the answer at 810 is judged yes, at 820, the amount of the second fuel that is delivered to the engine from the second fuel storage tank may be increased relative to the amount of the first fuel that is delivered to the engine from the first fuel storage tank. In this way, a suitable level of knock suppression may be provided even when a concentration of the knock suppressing component in the knock suppressing fuel is reduced by fuel transfer between fuel storage tanks. Conversely, if the concentration of the knock suppressing component is increased (e.g. by the vehicle operator refueling one of the fuel storage tanks with a knock suppressant rich fuel), the control system may instead reduce the amount of the knock suppressant fuel that is delivered to the engine relative to the other fuel in accordance with the updated concentration of the knock suppressing component in the second fuel.

At 830, it may be optionally judged whether a further increase in the amount of the knock suppressant fuel is to be performed. For example, the control system may judge the answer at 830 to be no when a fuel injector's maximum pulse-width would otherwise be exceeded or whether a deviation of the prescribed air/fuel ratio would occur as a result of a further increase in the amount of the knock suppressing fuel delivered to the engine. If the answer at 830 is judged no, the level of boosted intake air may be reduced in response to the concentration of the knock suppressing component in the fuel in order to reduce or eliminate engine knock. For example, the control system may reference a function, look-up table, or map stored in memory in order to select a suitable operating state for the boosting device that is in accordance with one or more of the changing fuel composition, relative amounts of each fuel delivered to the engine, and/or other operating conditions, including engine speed and engine load.

In other words, for a given set of operating conditions, the control system may operate the boosting device to provide a lower level of boost when the concentration of the knock suppressing component in one or more of the fuels is lower and may operate the boosting device to provide a higher level of boost when the concentration of the knock suppressing component in one or more of the fuels is higher. In this way, engine knock may be reduced or eliminated even as the composition of one or more of the fuels that are delivered to the engine or available for delivery to the engine are changing. Alternatively, if the answer at 830 is judged yes, the process flow may return to 820 where further adjustments of the relative amounts of each fuel that are delivered to the engine may be performed by the control system.

In some embodiments, operations 820 and/or 830 may be omitted by the control system. For example, the process flow may proceed directly to 840 from 810. In this way, engine boost may be adjusted in response to fuel composition without an adjustment to the relative amount of each fuel delivered to the engine by the fuel injectors.

While an example fuel delivery system has described generally with reference to fuel delivery system 200, FIGS. 9-14 provide some more specific non-limiting examples of fuel delivery system 200 that may be used to deliver fuel to a fuel burning engine, such as engine 10 of FIG. 1.

Figure 9:
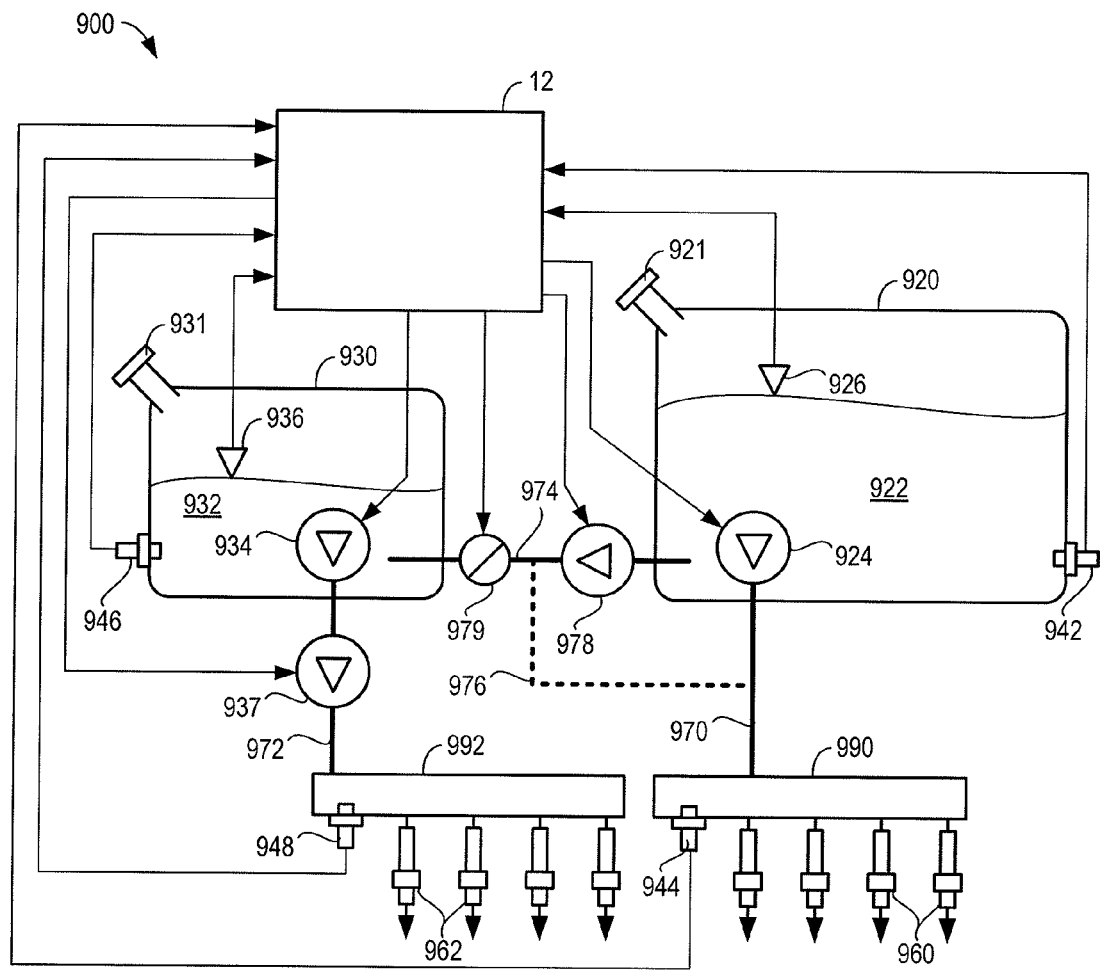
FIGS. 9-12 schematically depict specific example embodiments of the fuel delivery system of FIG. 2.

Referring to FIG. 9, an example fuel delivery system 900 is depicted schematically. Fuel delivery system 900 may be operated to perform some or all of the operations previously described with reference to the process flow of FIGS. 3-8.

Fuel delivery system 900 may include a first fuel storage tank 920 and a second fuel storage tank 930. As depicted schematically in FIG. 9, fuel storage tanks 920 and 930 can have different fuel storage capacities. However, it should be appreciated that fuel storage tanks 920 and 930 may have the same fuel storage capacity in other embodiments. As one example, fuel may be provided to fuel storage tanks 920 and 930 via respective fuel filling passages 921 and 931.

As a non-limiting example, fuel storage tank 920 may be configured in the fuel delivery system to store a first fuel while fuel storage tank 930 may be configured in the fuel delivery system to store a second fuel having a higher concentration of a knock suppressant component than the first fuel. For example, fuel filling passages 921 and 931 may include fuel identification markings for identifying the type of fuel that is to be provided to each fuel storage tank.

Fuel contained in fuel storage tank 922 can be delivered to the engine via fuel passage 970. Fuel passage 970 can include one or more fuel pumps indicated schematically at 924. Fuel pump 924 can be electrically or mechanically powered and can be disposed at least partially within fuel storage tank 920. Fuel passage 970 can communicate with fuel injectors of a first fuel injector group 960 via a fuel rail 990. Injector group 960 can refer to first injector group 270 of fuel delivery system 200. As a non-limiting example, the fuel injectors of fuel injector group 960 can be configured as port fuel injectors, for example, as previously described with reference to fuel injector 160.

While fuel rail 990 is shown in the example of FIG. 9 to be dispensing fuel to four fuel injectors as indicated at 960, it should be appreciated that fuel rail 990 may dispense fuel to any suitable number of fuel injectors. As one example, fuel rail 990 may dispense fuel to one fuel injectors of group 960 for each cylinder of the engine. In this way, fuel contained in fuel storage tank 920 can be delivered to each engine cylinder via a respective one of fuel injectors of group 960. Note that in other examples, fuel passage 970 can provide fuel to the fuel injectors of group 960 via two or more fuel rails. For example, where the engine cylinders are configured in a Vee configuration, two fuel rails may be used to distribute fuel from fuel passage 970 to each of the fuel injectors of first injector group 960.

Fuel contained in fuel storage tank 930 can be delivered to the engine via fuel passage 972. Fuel passage 972 can include one or more fuel pumps indicated at 934 and 937. In this particular example, fuel pump 934 may be configured as a lower pressure fuel pump and fuel pump 937 may be configured as a higher pressure fuel pump. As a non-limiting example, fuel pump 934 may be electrically powered and may be disposed at least partially within fuel storage tank 930, and fuel pump 937 may be mechanically powered from a crankshaft or camshaft of the engine. For example, pump 937 may be powered from a crank shaft or cam shaft of the engine. It should be appreciated that pumps 924, 934 and 937 may be powered by any suitable mechanical or electrical input.

Fuel passage 972 can communicate with fuel injectors of a second fuel injector group 962 via a fuel rail 992. Injector group 962 can refer to first injector group 280 of fuel delivery system 200. As a non-limiting example, fuel injectors 962 can be configured as direct injectors, for example, as previously described with reference to fuel injector 162. Where injectors 962 are configured as direct injectors, fuel pumps 934 and 937 can be operated to provide a higher fuel pressure to fuel rail 992 than the fuel pressure that is provided to fuel rail 990 by fuel pump 924.

Fuel may be transferred between fuel storage tank 920 and fuel storage tank 930 via fuel transfer passage 974. Fuel transfer passage 974 may include one or more pumps indicated schematically at 978 to facilitate the fuel transfer. Further, fuel transfer passage 974 may include a valve 979 for selectively opening and closing fuel transfer passage 974. In other embodiments, one of the fuel storage tanks may be arranged at a higher elevation than the other fuel storage tank, whereby fuel may be transferred from the higher fuel storage tank to the lower fuel storage tank via fuel transfer passage 974. For example, fuel storage tank 920 that is fluidly coupled with port fuel injectors of fuel injector group 960 may be arranged at a higher elevation than fuel storage tank 930 that is fluidly coupled direct fuel injectors of fuel injector group 962. In this way, fuel may be transferred between fuel storage tanks by gravity without necessarily requiring a fuel pump to facilitate the fuel transfer. Thus, in some embodiments, fuel pump 978 may be omitted.

In other examples, pump 978 may be omitted where fuel may be transferred to fuel transfer passage 974 via fuel passage 976. Thus, with alternative approach, fuel pump 924 can provide fuel to one or both of fuel rail 990 and fuel storage tank 930. Further in some examples, valve 979 may be configured as a pressure relief valve that can passively be opened when fuel pump 978 or fuel pump 924 provide fuel of a suitable pressure to fuel transfer passage 974 to overcome the pressure relief setting of the pressure relief valve. In this way, valve 979 may be actively or passively controlled by control system 12 to vary the rate of fuel transfer between fuel storage tanks 920 and 930.

The various components of fuel delivery system 900 can communicate with a control system depicted schematically at 12. For example, control system 12 can receive an indication of operating conditions from various sensors associated with fuel delivery system 900 in addition to the sensors previously described with reference to FIG. 1. For example, control system 12 can receive an indication of an amount of fuel stored in each of fuel storage tanks 920 and 930 via fuel level sensors 926 and 936, respectively.

Control system 12 can also receive an indication of fuel composition from one or more fuel composition sensors, in addition to or as an alternative to an indication of fuel composition that is inferred from exhaust gas sensor 126. For example, one or more fuel composition sensors may be configured to provide an indication of the composition of the fuel contained in each of fuel storage tanks 920 and 930 via sensor 942 and 946, respectively. Additionally or alternatively, one or more fuel composition sensors may be provided at any suitable location along the fuel delivery circuit between the fuel storage tanks and their respective fuel injectors. For example, fuel composition sensor 944 may be provided at fuel rail 990 or along fuel passage 970, and/or fuel composition sensor 948 may be provided at fuel rail 992 or along fuel passage 972. As a non-limiting example, these fuel composition sensors can provide control system 12 with an indication of a concentration of a knock suppressing component contained in the fuel or may provide control system 12 with an indication of an octane rating of the fuel. For example, one or more of these fuel composition sensors can provide an indication of a concentration of alcohol in the fuel.

Note that the relative location of the fuel composition sensors within the fuel delivery system can provide different advantages. For example, sensors 944 and 948, which are arranged along the fuel passages coupling the fuel injectors with one or more fuel storage tanks can provide an indication of a resulting fuel composition where two or more different fuels are combined before being delivered to the engine. In contrast, sensors 946 and 942 provide an indication of fuel composition at the fuel storage tanks, which may differ from the composition of the fuel actually delivered to the engine.

Control system 12 can also control the operation of each of fuel pumps 924, 934, 937, and 978 to provide fuel to the various fuel delivery system components as described herein with reference to the process flow. As one example, control system 12 can vary a pressure setting and/or fuel flow rate of the fuel pumps to deliver fuel to different locations of the fuel delivery system.

Figure 10A:
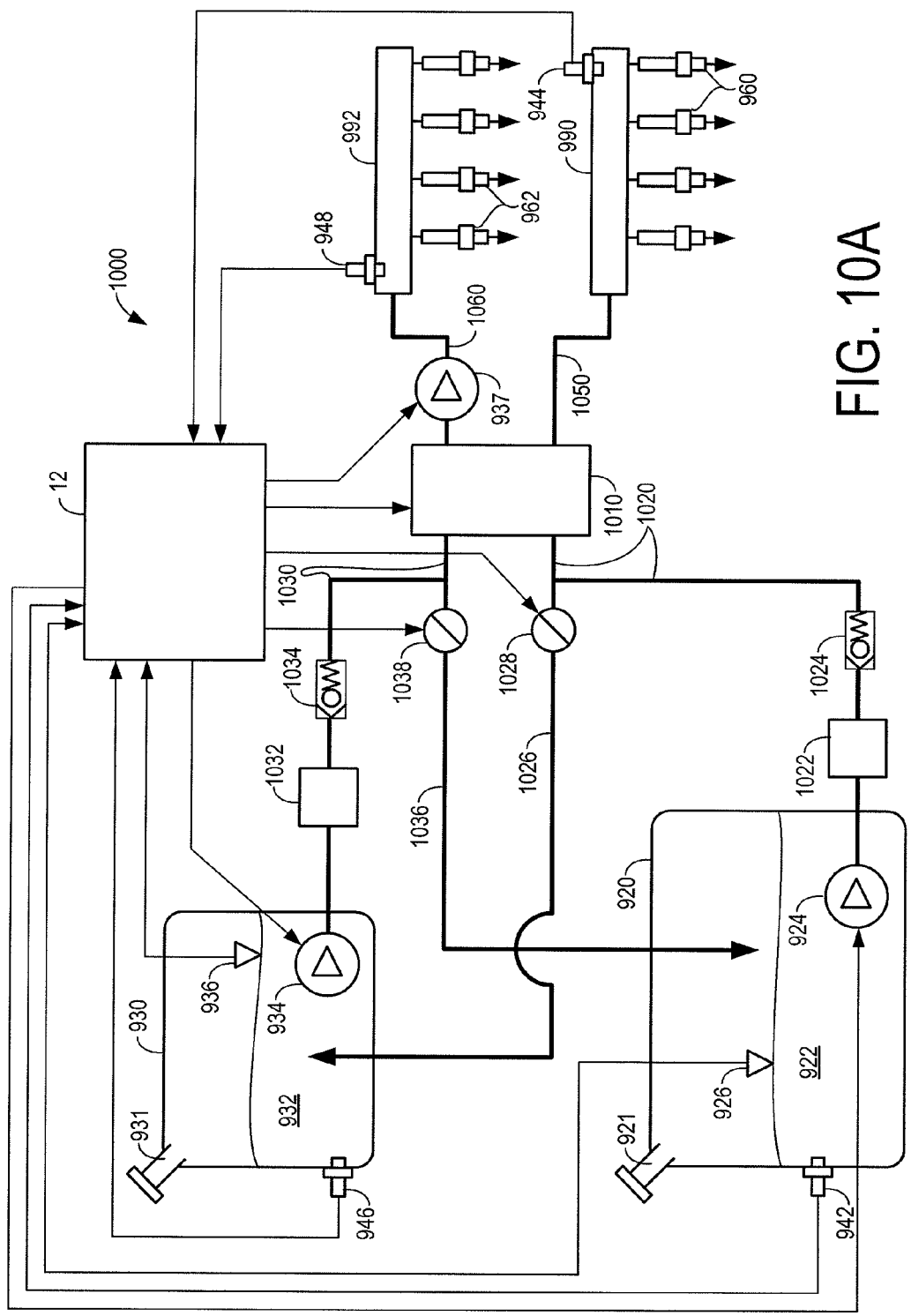

Referring to FIG. 10A, a second example embodiment of a fuel delivery system is depicted schematically as fuel delivery system 1000. Some of the previously described components of fuel delivery system 900 may also be present in fuel delivery system 1000. However, in this particular example, fuel contained in fuel storage tanks 920 and/or 930 can be supplied to one or more of fuel injector groups 960 and 962 via a valve 1010. As a non-limiting example, valve 1010 may be configured as a spool valve.

As one example, fuel may be provided to a fuel receiving side of valve 1010 from fuel storage tank 920 via a fuel passage 1020. Fuel passage 1020 may include one or more pressure relief valves indicated at 1024 to resist or inhibit fuel flow back into fuel storage tank 920 via fuel passage 1020. Fuel passage 1020 may optionally include one or more fuel filters indicated schematically at 1022.

Similarly, fuel may be provided to the fuel receiving end of valve 1010 from fuel storage tank 930 via a fuel passage 1030. Fuel passage 1030 may also include one or more pressure relief valves indicated schematically at 1034 and/or one or more fuel filters indicated at 1032. Note that in some embodiments, pressure relief valves 1024 and/or 1034 may be omitted, thereby enabling fuel to flow into the fuel storage tank as will be described with reference to FIGS. 10I and 10J.

Fuel may be provided to fuel rails 990 and 992 from respective fuel dispensing ends of valve 1010 via fuel passages 1050 and 1060, respectively. In some examples, fuel passage 1060 can include a higher pressure pump 937 to further increase the fuel pressure delivered to fuel rail 992, particularly where the fuel injectors of fuel injector group 962 are configured as direct fuel injectors.

Figure 10B:
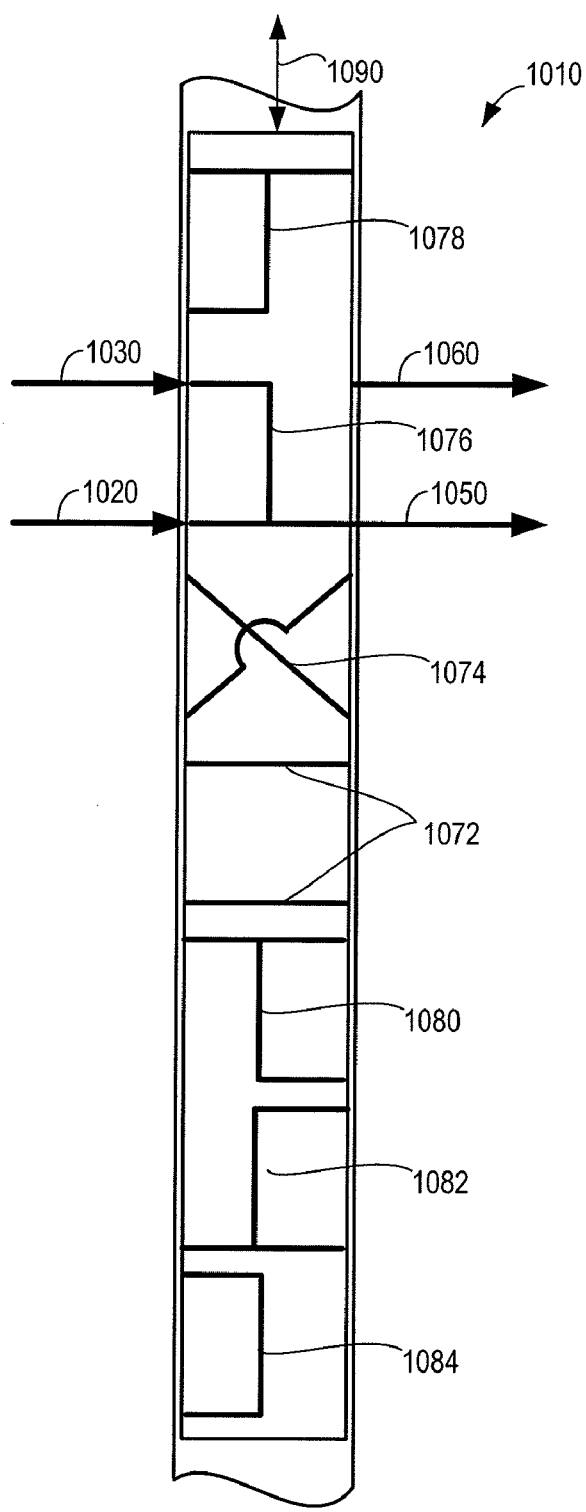

Referring also to FIG. 10B, a schematic depiction of valve 1010 is provided. In this particular example, valve 1010 includes a plurality of different valve positions or settings indicated schematically at 1072-1084. These different valve positions can be selected so that fuel delivered to the receiving ends of the valve via one or more of fuel passages 1020 and 1030 can be dispensed to one or more of fuel passages 1050 and 1060 in accordance with the selected valve position.

For example, as shown in FIG. 10B, valve position 1076 of valve 1010 is currently selected by the control system, which enables fuel that is received at each of fuel passages 1020 and 1030 to be directed to fuel passage 1050 of fuel rail 990 and fuel passage 1060 of fuel rail 992, respectively. As a non-limiting example, valve 1010 may be adjusted by control system 12 between two or more of the depicted valve positions via an actuator such as a solenoid, indicated schematically at 1090. Thus, the control system is configured to adjust valve 1010 between at least a first valve setting and a second valve setting via the solenoid actuator 1090. It should be appreciated that any suitable actuation device may be used that enables control system 12 to select between two or more different valve positions. Further, it should be appreciated that while the direction of actuation as been depicted to by in a linear direction, it should be appreciated that valve 1010 may be adjusted between two or more valve positions by any suitable approach.

Figure 10C:
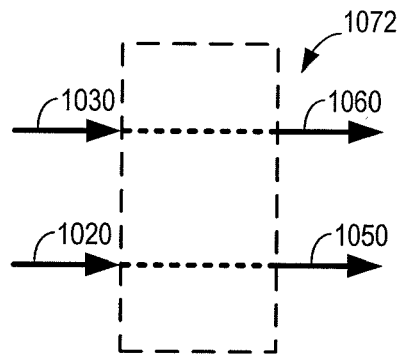

Referring also to FIGS. 10C-10J, each of valve positions 1072-1084 will be described in greater detail. FIG. 10C, for example, shows a fuel flow path that may be provided via valve position 1072 of valve 1010. In this example, fuel passages 1030 and 1060 are fluidly coupled, thereby enabling fuel to be delivered to fuel injector group 962 from fuel storage tank 930. Fuel passages 1020 and 1050 are also fluidly coupled, thereby enabling fuel to be delivered to fuel injector group 960 from fuel storage tank 920.

Figure 10D:
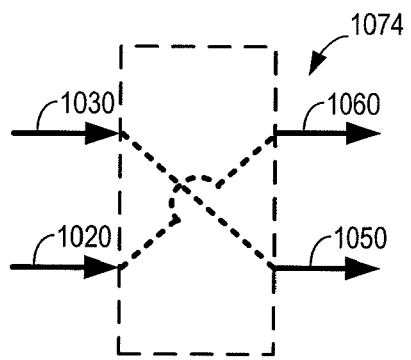

FIG. 10D shows another example fuel flow path that may be provided via valve position 1074 of valve 1010. In this example, fuel passages 1020 and 1060 are fluidly coupled, thereby enabling fuel to be delivered to fuel injector group 962 from fuel storage tank 920. Further, fuel passages 1030 and 1050 are also fluidly coupled thereby enabling fuel to be delivered to fuel injector group 960 from fuel storage tank 930.

Figure 10E:
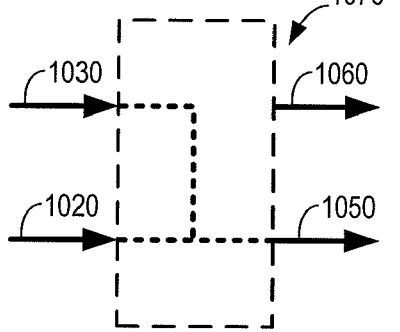

FIG. 10E shows another example fuel flow path that may be provided via valve position 1076 of valve 1010. In this example, fuel passages 1020 and 1030 are fluidly coupled with fuel passage 1050, while fuel passage 1060 is closed, thereby enabling fuel to be delivered to fuel injector group 960 from each of fuel storage tanks 920 and 930. In this way, fuel that is provided to fuel group 960 can include a mixture of two different fuels. When valve position 1076 of valve 1010 is selected, the control system may optionally deactivate one or more of the fuel injectors associated with fuel injector group 962 and may optionally deactivate fuel pump 937. Note that valve position 1076 can be used to combine or mix different fuels received via fuel passages 1020 and 1030 prior to injection by fuel injector group 960.

As a non-limiting example, the control system can utilize feedback from fuel composition sensor 944 to enable the control system to adjust the relative amounts and/or pressures of each fuel that is provided to valve 1010 via fuel passages 1020 and 1030. In some embodiments, the control system can vary the relative amounts and/or pressures of each fuel by adjusting an operating parameter of pump 924 relative to pump 934. For example, to increase a concentration of the second fuel of fuel storage tank 930 in the resulting fuel mixture that is provided to cylinder group 960 via fuel passage 1050, the control system can increase the pumping work provided by pump 934 relative to pump 924. Conversely, to reduce a concentration of the second fuel of the fuel storage tank 930 in the resulting fuel mixture, the control system can increase the pumping work provided by pump 924 relative to pump 934 to thereby increase the flow rate of the first fuel of fuel storage tank 920 relative to the second fuel.

Figure 10F:
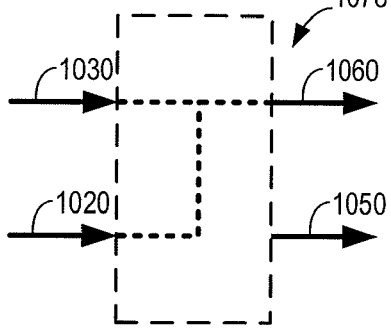

FIG. 10F shows yet another example fuel flow path that may be provided via valve position 1078 of valve 1010. In this example, fuel passages 1020 and 1030 are fluidly coupled with fuel passage 1060, while fuel passage 1050 is closed, thereby enabling fuel to be delivered to fuel injector group 962 from each of fuel storage tanks 920 and 930. In this way, fuel that is provided to fuel group 962 can include a mixture of two different fuels. When valve position 1078 of valve 1010 is selected, the control system may optionally deactivate fuel injectors 990. As described with reference to FIG. 10E, pumps 924 and 934 can be operated to adjust the relative proportion of each fuel that is delivered to fuel injector group 962 in the resulting fuel mixture that is obtained by valve position 1078 of valve 1010.

Figure 10G:
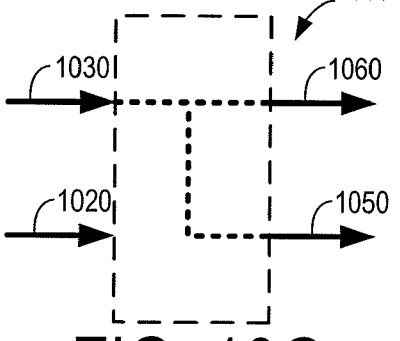

FIG. 10G shows yet another example fuel flow path that may be provided via valve position 1080 of valve 1010. In this example, fuel passage 1030 is fluidly coupled with fuel passages 1060 and 1050, while fuel passage 1020 is closed, thereby enabling fuel to be delivered to each of fuel injector groups 960 and 962 from fuel storage tank 930. When valve position 1080 of valve 1010 is selected, the control system may optionally deactivate fuel pump 924.

Figure 10H:
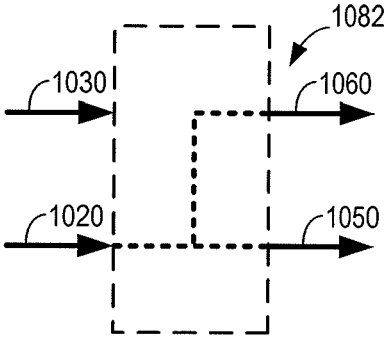

FIG. 10H shows yet another example fuel flow path that may be provided via valve position 1082 of valve 1010. In this example, fuel passage 1020 is fluidly coupled with fuel passages 1060 and 1050, while fuel passage 1030 is closed, thereby enabling fuel to be delivered to each of fuel injector groups 960 and 962 from fuel storage tank 920. When valve position 1082 of valve 1010 is selected, the control system may optionally deactivate fuel pump 934.

Figure 10I:
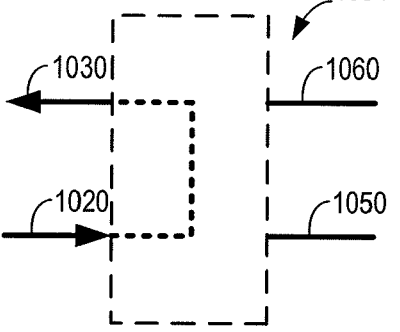
Figure 10J:
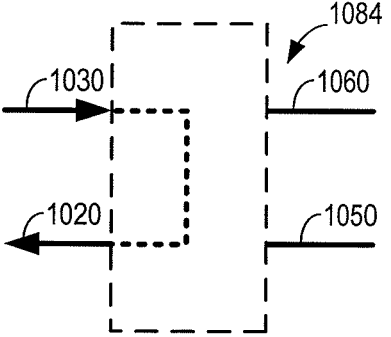

FIGS. 10I and 10J shows still other example fuel flow paths that may be provided via respective valve positions 1084 of valve 1010. In this example, fuel passage 1020 is fluidly coupled with fuel passages 1030. Where fuel pump 924 is operated and fuel pump 934 is deactivated, fuel can be transferred from fuel storage 920 to fuel storage tank 930 as shown in FIG. 10I. Alternatively, where fuel pump 934 is operated and fuel pump 924 is deactivated, fuel can be transferred from fuel storage 930 to fuel storage tank 920 as shown in FIG. 10J. Note that one or more of fuel passages 1020 and 1030 can be provided with pressure relief valves that are placed in parallel with fuel pumps 924 and/or 934, respectively, as described with reference to valves 1114 and 1124 of FIG. 11. Further, where valve 1010 includes valve position 1084, fuel passages 1036 and 1026 can be optically omitted since fuel can be instead transferred between the fuel storage tanks by way of the valve. Further still, it should be appreciated that fuel can be transferred between the fuel storage tanks using valve settings 1076 or 1078 by selectively deactivating one of the fuel pumps while operating the other fuel pump to transfer the fuel to the other fuel storage tank by way of the valve. In some embodiments, fuel injector groups 960 and 962 may be optionally deactivated when valve settings 1080 and 1082 are selected.

In this way, valve 1010 can be adjusted by the control system to provide different fuel flow paths between fuel storage tanks 920/930 and fuel injector groups 960/962. It should be appreciated that valve 1010 may include any suitable number or combination of the disclosed valve positions and that other suitable valve positions may be utilized to provide other fuel flow paths. Further, it should be appreciated that valve 1010 may be replaced with one or more other valves to provide one or more of the various fuel flow paths described with reference to FIGS. 10C-10J.

Returning again to FIG. 10A, fuel may also be transferred between fuel storage tanks 920 and 930. As a non-limiting example, a first fuel transfer passage 1026 can be provided to enable fuel transfer from fuel storage tank 920 to fuel storage tank 930. In some examples, fuel transfer passage 1026 can include one or more valves indicated at 1028 for adjusting the flow rate of fuel that is transferred to fuel storage tank 930 from fuel storage tank 920 via fuel transfer passage 1026. In this way, fuel pump 924 can be operated to provide fuel to one or more of valve 1010 and fuel storage tank 930.

Alternatively or additionally, a second fuel transfer passage 1036 may be provided to enable fuel transfer from fuel storage tank 930 to fuel storage tank 920. In some examples, fuel transfer passage 1036 can include one or more valves indicated at 1038 for adjusting the flow rate of fuel that is transferred to fuel storage tank 920 from fuel storage tank 930 via fuel transfer passage 1036. In this way, fuel pump 934 can be operated to provide fuel to one or more of valve 1010 and fuel storage tank 920.

It should be appreciated that valves 1028 and 1038 may be actively controlled by control system 12 or may be configured as passive pressure relief valves, whereby the control system can adjust fuel transfer flow rate by adjusting a fuel pressure provided to each valve by a fuel pump. For example, fuel may be transferred from fuel storage tank 920 to fuel storage tank 930 via fuel passage 1026 when fuel pump 924 has provided a fuel pressure to valve 1028 that exceeds its pressure relief setting.

Figure 11:
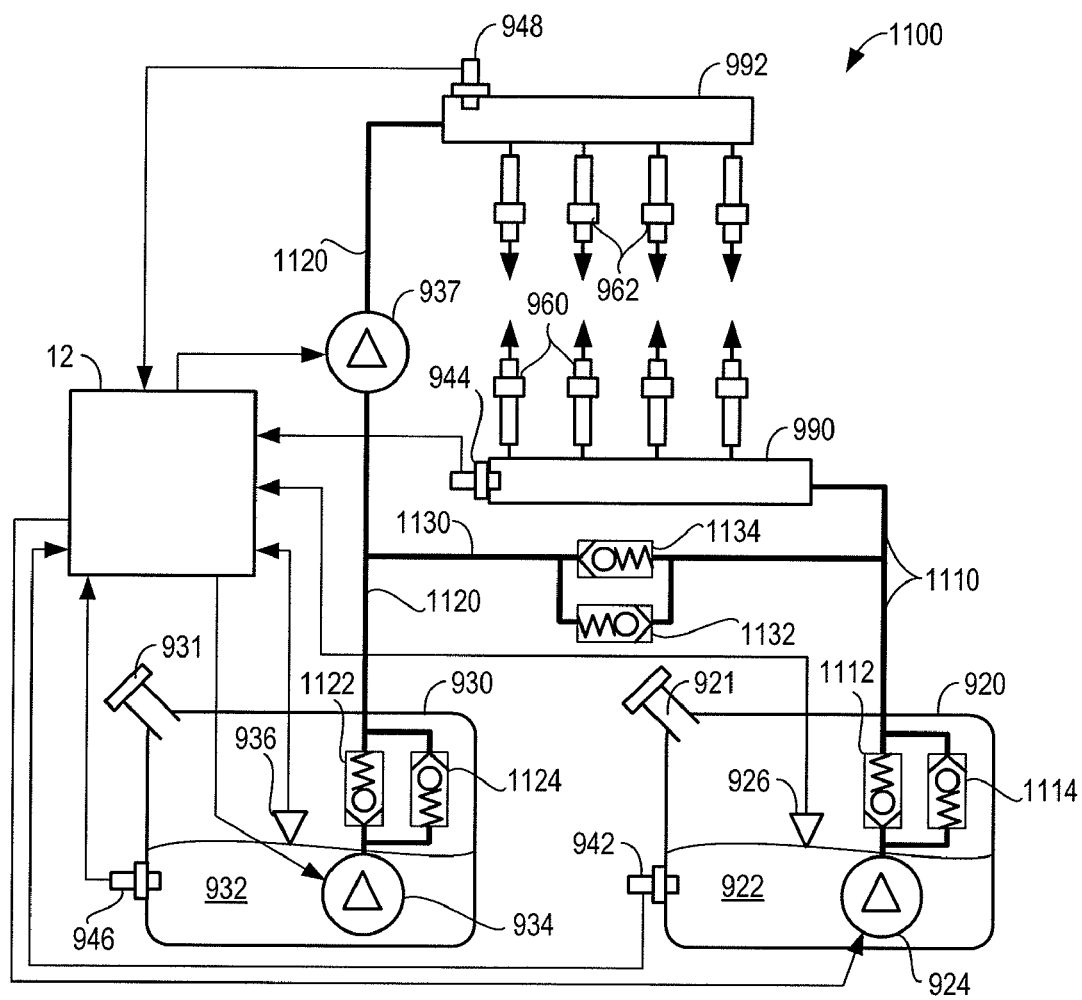

Referring to FIG. 11, an example fuel delivery system 1100 is depicted schematically. Some of the previously described components of fuel delivery system 900 may be present in fuel delivery system 1100. However, in this particular example, at least one fuel transfer passage is provided with one or more pressure relief valves to enable fuel to be transferred between the fuel storage tanks and/or fuel rails. As a non-limiting example, passive pressure relief valves may be provided to enable different fuel delivery modes to be selected by the control system by adjusting operation of the fuel pumps and/or fuel injectors. However, it should be appreciated that these pressure relief valves may be actively controlled in some examples by any suitable actuation device to enable direct control of their opening and closing by the control system.

In this particular example, fuel may be delivered to fuel rail 990 from fuel storage tank 920 via fuel passage 1110 and fuel may be delivered to fuel rail 992 from fuel storage tank 930 via fuel passage 1120. Fuel passages 1110 and 1120 may each include one or more fuel pumps. For example, fuel passage 1110 may include a lower pressure fuel pump 924 where fuel rail 990 is configured to distribute fuel to port fuel injectors. Fuel passage 1120 may include one or more of a lower pressure fuel pump 934 and a higher pressure fuel pump 937 where fuel rail 992 is configured to distribute fuel to direct fuel injectors.

A fuel transfer passage 1130 may be provided to fluidly couple fuel passages 1110 and 1120. Fuel transfer passage 1130 may include one or more pressure relief valves. For example, a first pressure relief valve 1132 may be provided to enable fuel transfer from fuel passage 1110 to fuel passage 1120, where the transferred fuel may be received by one or both of fuel storage tank 930 and fuel rail 992. Pressure relief valve 1132 can reduce or prevent back flow of fuel from fuel passage 1120 to fuel passage 1110. Alternatively or additionally, a second pressure relief valve 1134 may be provided to enable fuel transfer from fuel passage 1120 to fuel passage 1110, where the transferred fuel may be received by one or both of fuel storage tank 920 and fuel rail 990. Pressure relief valve 1134 can reduce or prevent back flow of fuel from fuel passage 1110 to fuel passage 1120.

In still other examples, a plurality of fuel transfer passages may be provided between fuel passages 1110 and 1120, whereby each of the plurality of fuel transfer passages include at least one pressure relief valve. As one example, a first fuel transfer passage may include a first pressure relief valve that permits fuel transfer from fuel passage 1110 to fuel passage 1120, but resists or prohibits fuel flow from fuel passage 1120 to fuel passage 1110. Further, the second fuel transfer passage may include a second pressure relief valve that permits fuel transfer from fuel passage 1120 to fuel passage 1110, but resists or prohibits fuel flow from fuel passage 1110 to fuel passage 1120.

As one non-limiting example, pressure relief valves 1132 and 1134 may have a pressure relief setting that causes the pressure relief valves to open under select pressure conditions. For example, pressure relief valve 1132 can open to permit fuel flow from fuel passage 1110 to fuel passage 1120 along fuel transfer passage 1130 when the fuel pressure on the fuel passage 1110 side of the valve is at least 1 bar higher than the pressure on the other side of the valve. Similarly, pressure relief valve 1134 can open to permit fuel flow from fuel passage 1120 to fuel passage 1110 along fuel transfer passage 1130 when the fuel pressure on the fuel passage 1120 side of the valve is at least 1 bar higher than the pressure on the other side of the valve.

Still other pressure relief valves 1112, 1114, 1122, and 1124 may be provided. Continuing with the above example, pressure relief valves 1114 and 1124 can be configured to permit fuel to re-enter their respective fuel storage tanks when the fuel pressure exceeds 4 bar on the fuel rail side of the valve. However, when the fuel pumps are operating, fuel may be permitted to re-enter the fuel storage tank when the pressure on the fuel rail side of the pressure relief valve (1114/1124) exceeds the sum of the pump pressure and the pressure relief setting of the valve. In this way, valves 1132 and 1134 can be configured to permit fuel transfer when the fuel pressure setting of one of pumps 924 and 934 causes a fuel pressure difference across the pressure relief valve to exceed 5 bar.

It should be appreciated that these pressure relief settings are exemplary and that other values may be used while still retaining a relative difference between the pressure relief settings of pressure relief valves 1132/1134 and pressure relief valves 1114/1124. In still other examples, pressure relief valves 1132/1134 may have higher pressure relief settings than pressure relief valves 1114/1124. Typically, pressure relief valve 1112 will have a lower pressure relief setting than pressure relief valve 1114 which is oriented in the opposite flow direction, and pressure relief valve 1122 will typically have a lower pressure relief setting than pressure relief valve 1124 which is also oriented in the opposite flow direction.

By adjusting the operation of the various fuel pumps and fuel injectors, the control system, including control system 12, can select a suitable fuel source and a suitable fuel sink in accordance with the previously described process flow. It should be appreciated that where one or more of the pressure relief valves include actuators, the control system can select transfer fuel by actively opening or closing the pressure relief valves. Various modes of operation that may be achieved with fuel delivery system 1100 are described in greater detail with reference to FIG. 13.

Figure 12:
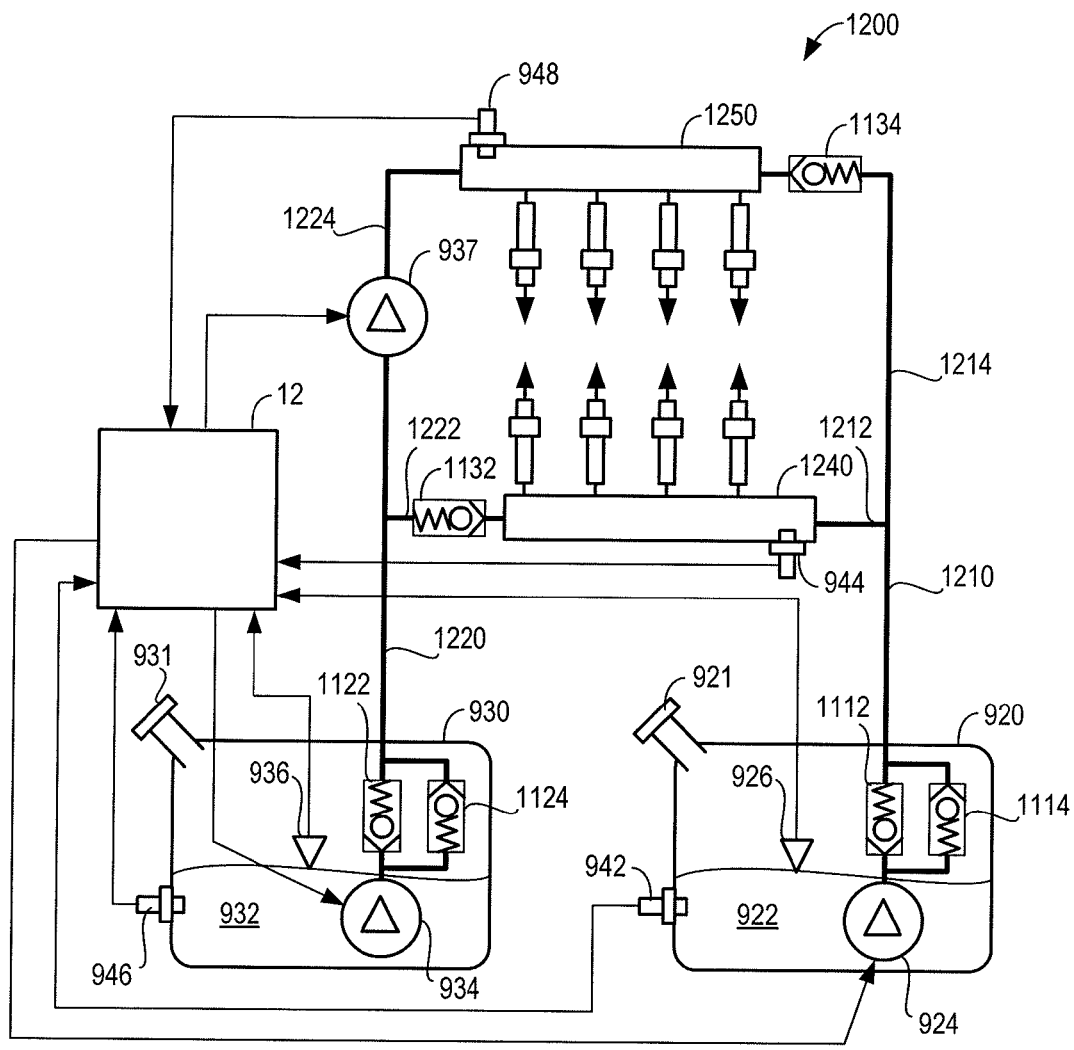

Referring to FIG. 12, an example fuel delivery system 1200 is depicted schematically. Some of the previously described components of fuel delivery systems 900 and 1100 may be present in fuel delivery system 1200. However, in this particular example, fuel may be transferred to various components of the fuel delivery system via one or more of fuel rails 1250 and 1260. As one example, fuel may be transferred through fuel rails 1250 and 1260 to flush the fuel rail of a previously used fuel. For example, the control system can operate fuel pump 924 at a pressure setting that exceeds the pressure relief setting of pressure relief valve 1132, thereby enabling fuel to flow from fuel storage tank 920 through fuel rail 1240 and carrying with it any different type of fuel that may have been retained in the fuel rail. In this way, changes in the type of fuel delivered to the engine may be accommodated more rapidly since the engine need not consume the previously available fuel before receiving a new fuel.

In this example, fuel may be provided to fuel rail 1240 from fuel storage tank 920 by fuel pump 924 via fuel passage 1210 and 1212. Fuel may also be provided to fuel rail 1250 from fuel storage tank 930 by fuel pumps 934 and/or 937 via fuel passages 1220 and 1224. In some examples, fuel pump 937 may be optionally omitted. As a non-limiting example, fuel rail 1250 may be configured to distribute fuel to one or more fuel injectors 962 while fuel rail 1240 may be configured to distribute fuel to one or more fuel injectors 960. As previously described, fuel injectors 962 may refer to direct fuel injectors and fuel injectors 960 may refer to port fuel injectors.

A fuel passage 1214 fluidly coupling fuel rail 1250 with fuel passages 1210 and/or 1212 may be provided. Fuel passage 1214 can include a pressure relief valve 1134 that reduces or prohibits fuel flow to fuel rail 1250 via fuel passage 1214, but can selectively permit fuel flow from fuel rail 1250 via fuel passage 1214.

As one example, pressure relief valve 1134 may be configured to passively regulate the fuel pressure in fuel rail 1250. For example, pressure relief valve 1134 can open to permit fuel to flow from fuel rail 1250 via fuel passage 1214 when a fuel pressure at fuel rail 1250 exceeds a pressure relief setting relative to the fuel pressure on the opposite side of the valve. As one non-limiting example, pressure relief valve 1134 includes a spring biased valve that is configured to open when the pressure difference across the valve exceeds the closing force provided by the spring. However, in other examples, pressure relief valve 1134 may be actively opened or closed by control system 12. For example, pressure relief valve 1134 may include an actuator (e.g. a solenoid) to actively open or close the valve in response to a control signal from control system 12.

Alternatively or additionally, a fuel passage 1222 fluidly coupling fuel rail 1240 with fuel passages 1220 and/or 1224 may be provided. Fuel passage 1222 may include a pressure relief valve 1132. Pressure relief valve 1132 can be configured to reduce or prohibit fuel flow to fuel rail 1240 via fuel passage 1222, but can selectively permit fuel flow from fuel rail 1240 via fuel passage 1132. Thus, pressure relief valve 1132 can be configured to passively or actively regulate fuel pressure in fuel rail 1240 and pressure relief valve 1134 can be configured to passively or actively regulate fuel pressure in fuel rail 1250. By adjusting the operation of the various fuel pumps, the fuel injectors, and/or the pressure relief valves, the control system including control system 12 can deliver fuel from one or more of fuel storage tanks 920 and 930 to one or more of fuel rails 1240 and 1250.

FIG. 13 provides a mode table that describes some example fuel delivery modes that may be performed by fuel delivery systems 1100 and 1200. Referring to Mode 1, fuel may be delivered to the engine via fuel injectors 962 from fuel storage tank 930. To perform Mode 1 with reference to fuel delivery system 1200, fuel pump 934 may be operated at a first pressure setting ($P_A$) to provide fuel to fuel rail 1250 via fuel passages 1220 and 1224 while fuel injectors 962 may be operated to inject fuel. To perform Mode 1 with reference to fuel delivery system 1100, fuel pump 934 may be operated at pressure setting ($P_A$) to provide fuel to fuel rail 992 via fuel passage 1120 while fuel injectors 962 may be operated to inject fuel.

The pressure setting $P_A$ of can correspond to a resulting fuel pressure at pressure relief valve 1134 that is less than its pressure relief setting and therefore does not cause pressure relief valve 1134 to open. During Mode 1, fuel injectors 960 and fuel pump 924 can be optionally deactivated. Further, fuel pump 937 may be optionally operated to assist fuel pump 934. However, during Mode 1, it should be appreciated that the combined fuel pressure increase provided by fuel pumps 934 and 937 can be any suitable value that does not open pressure relief valve 1134. As one example, the fuel pressure increase provided by fuel pumps 934 and 937 can correspond to pressure setting $P_A$ so that pressure relief valve 1134 is not opened to enable fuel flow to the other fuel rail.

Referring to Mode 2, fuel may be delivered to the engine via one or more of fuel injectors 962 and fuel injectors 960 from fuel storage tank 930. To perform Mode 1 with reference to fuel delivery system 1200, fuel pump 934 may be operated at a second pressure setting ($P_B$) to provide fuel to fuel rail 1250 via fuel passages 1220 and 1224 while fuel injectors 962 may be operated to inject fuel. To perform Mode 1 with reference to fuel delivery system 1100, fuel pump 934 may be operated at pressure setting ($P_B$) to provide fuel to fuel passage 1130. Pressure setting ($P_B$) can corresponds to a resulting fuel pressure at pressure relief valve 1134 that causes pressure relief valve 1134 to open, but does not cause fuel pressure relief valve 1114 to open. Thus, pressure setting ($P_B$) can be greater than pressure setting ($P_A$). As pressure relief valve 1134 is opened, fuel can flow to fuel rail 1240 via fuel passages 1214 and 1212 of fuel delivery system 1200 or to fuel rail 990 via fuel passages 1130 and 1110 of fuel delivery system 1100. Note that in some examples, fuel injectors 962 may be temporarily deactivated while fuel that was previously contained in fuel rail 1250 may be removed by the new fuel passing through the fuel rail on its way through pressure relief valve 1134. During Mode 2, fuel pump 924 can be optionally deactivated. Further, fuel pump 937 may be optionally operated to assist fuel pump 934. However, for Mode 2, it should be appreciated that the combined fuel pressure increase provided by fuel pumps 934 and 937 can be at least $P_B$ so that pressure relief valve 1134 is opened to enable fuel flow to each fuel rail, but less than a resulting fuel pressure at pressure relief valve 1114 that exceeds its pressure relief setting so that pressure relief valve 1114 remains closed. Note that Mode 2 can correspond to valve setting 1080 as previously described with reference to FIG. 10G.

Referring to Mode 3, fuel may be delivered to the engine via fuel injectors 960 from fuel storage tank 930. To perform Mode 3, with reference to fuel delivery system 1200, fuel pump 934 may be operated at pressure setting ($P_B$) to provide fuel to fuel rail 1250 via fuel passages 1220 and 1224 while fuel injectors 962 are deactivated. As pressure relief valve 1134 is opened, fuel can flow from fuel rail 1250 to fuel rail 1240 via fuel passages 1214 and 1212. To perform Mode 3 with reference to fuel delivery system 1100, fuel pump 934 may be operated at pressure setting ($P_B$) to provide fuel to fuel rail 990 via fuel passages 1130 and 1110. During Mode 3, fuel pump 924 can be optionally deactivated. Further, fuel pump 937 may be optionally operated with reference to fuel delivery system 1200 to assist fuel pump 934. However, for Mode 3, it should be appreciated that the combined fuel pressure increase provided by fuel pumps 934 and 937 can be any suitable fuel pressure that causes pressure relief valve 1134 to open, but does not cause pressure relief valve 114 to open. As one example, fuel pumps 934 and 937 may be operated to achieve a combine pressure setting of $P_B$.

Referring to Mode 4, fuel may be delivered to the engine via fuel injectors 960 from fuel storage tank 920. To perform Mode 4, with reference to fuel delivery system 1200, fuel pump 924 may be operated at a first pressure setting ($P_D$) to provide fuel to fuel rail 1240 via fuel passages 1210 and 1212 while fuel injectors 960 may be operated to inject fuel. To perform Mode 4 with reference to fuel delivery system 1100, fuel pump 924 may be operated at pressure setting ($P_D$) to provide fuel to fuel rail 990 via fuel passage 1110 while fuel injectors 960 may be operated to inject fuel. Pressure setting ($P_D$) can correspond to a resulting fuel pressure at pressure relief valve 1132 that does not cause pressure relief valve 1132 to open. During Mode 4, fuel injectors 962 and fuel pumps 934,937 can be optionally deactivated.

Referring to Mode 5, fuel may be delivered to the engine via fuel injectors 962 and 960 from fuel storage tank 920. To perform Mode 5, with reference to fuel delivery system 1200, fuel pump 924 may be operated at a second pressure setting ($P_E$) to provide fuel to fuel rail 1240 via fuel passages 1210 and 1212 while fuel injectors 960 may be operated to inject fuel. The pressure setting ($P_E$) can correspond to a resulting fuel pressure at pressure relief valve 1132 that that exceeds its pressure relief setting, thereby causing pressure relief valve 1132 to open. Yet, pressure setting $P_E$ additionally corresponds to a resulting fuel pressure at pressure relief valve 1124 that does not cause pressure relief valve 1124 to open. As pressure relief valve 1132 is opened, fuel can flow to fuel rail 1250 via fuel passages 1222 and 1224 without flowing into fuel storage tank 930, whereby fuel injectors 960 may be operated to inject fuel. To perform Mode 5 with reference to fuel delivery system 1100, fuel pump 924 may be operated at pressure setting ($P_E$) to provide fuel to fuel rail 990 via fuel passage 1110 while fuel injectors 962 may be operated to inject fuel. Additionally, fuel may be delivered to fuel rail 992 via opened pressure relief valve 1132, whereby fuel injectors 960 may be operated to inject fuel. Note that in some examples, fuel injectors 960 may be temporarily deactivated while fuel that was previously contained in fuel rail 1240 may be removed by the new fuel passing through the fuel rail on its way through pressure relief valve 1132. During Mode 5, fuel pump 934 can be optionally deactivated. Further, fuel pump 937 may be optionally operated to assist fuel pump 924 provide sufficient fuel pressure to fuel rail 1250 or fuel rail 992. For example, fuel pump 937 may be operated to further increase fuel pressure to a pressure that is suitable for direct injection of fuel by injectors 962. Note that Mode 5 can correspond to valve setting 1082 as previously described with reference to FIG. 10H.

Referring to Mode 6, fuel may be delivered to the engine via fuel injectors 962 from fuel storage tank 920 while fuel injectors 960 are deactivated. To perform Mode 6, with reference to fuel delivery system 1200, fuel pump 924 may be operated at pressure setting ($P_E$) to provide fuel to fuel rail 1240 via fuel passages 1210 and 1212 while fuel injectors 960 are deactivated. As pressure relief valve 1132 is opened, fuel can flow from fuel rail 1240 to fuel rail 1250 via fuel passages 1222 and 1224. To perform Mode 6 with reference to fuel delivery system 1100, fuel pump 924 may be operated at pressure setting ($P_E$) to provide fuel to fuel rail 992 via fuel passages 1130 and 1120. During Mode 6, fuel pump 934 can be optionally deactivated. Further, fuel pump 937 may be optionally operated to assist fuel pump 924. For example, fuel pump 937 may be operated to further increase the fuel pressure to a pressure that is suitable for direct injection of fuel by injectors 962.

Referring to Mode 7, fuel may be delivered to the engine via fuel injectors 960 from fuel storage tank 920 and fuel may also be delivered to the engine via fuel injectors 962 from fuel storage tank 930. To perform Mode 7, with reference to fuel delivery systems 1100 and 1200, fuel pumps 924 and 934 may be operated at any suitable pressure relative to each other so that pressure relief valves 1132 and 1134 are not opened by a fuel pressure difference exceeding their respective pressure relief settings. Further, fuel pump 937 can be optionally operated to assist fuel pump 934 provide sufficient fuel pressure to fuel rail 1250 or 992 for direct injection of fuel by fuel injectors 962. Note that Mode 7 can correspond to valve setting 1072 as previously described with reference to FIG. 10C.

Referring to Mode 8, fuel may be transferred from fuel storage tank 930 to fuel storage tank 920 while fuel injectors 960 and 962 are deactivated. To perform Mode 8, with reference to fuel delivery system 1200, fuel pump 934 may be operated at a third pressure setting ($P_C$) to provide fuel to fuel rail 1250 via fuel passages 1220 and 1224. In this way, fuel may be transferred from a first fuel storage tank to a second fuel storage tank via at least one fuel rail. To perform Mode 8, with reference to fuel delivery system 1100, fuel pump 934 may be operated pressure setting ($P_C$) to provide fuel to fuel rail 992 via fuel passage 1130. Pressure setting ($P_C$) can correspond to a resulting fuel pressure at pressure relief valves 1134 and 1114 that exceeds their respective pressure relief settings. Thus, pressure setting ($P_C$) can be greater than pressure setting ($P_B$). Further, fuel pump 937 may be optionally operated to assist fuel pump 934 achieve pressure setting ($P_C$). Note that Mode 8 can correspond to valve setting 1084 as previously described with reference to FIG. 10J.

Referring to Mode 9, fuel may be transferred from fuel storage tank 920 to fuel storage tank 930 while fuel injectors 960 and 962 are deactivated. To perform Mode 9, with reference to fuel delivery system 1200, fuel pump 924 may be operated at a third pressure setting ($P_F$) to provide fuel to fuel rail 1240 via fuel passages 1210 and 1212. Pressure setting ($P_F$) of fuel pump 924 can correspond to a resulting fuel pressure at pressure relief valves 1132 and 1124 that exceeds their respective pressure relief settings, thereby enabling fuel to flow from fuel rail 1240 to fuel storage tank 930 via fuel passages 1222 and 1220. Thus, pressure setting ($P_F$) can be greater than pressure setting ($P_E$). In this way, fuel may be alternatively transferred from the second fuel storage tank to the first fuel storage tank via at least one fuel rail. To perform Mode 9, with reference to fuel delivery system 1100, fuel pump 924 may be operated at pressure setting ($P_F$) to provide fuel to fuel storage tank 930 via fuel passage 1130. Note that Mode 9 can correspond to valve setting 1084 as previously described with reference to FIG. 10I.

Referring to Mode 10, fuel may be transferred from fuel storage tank 930 to fuel storage tank 920 while one or more of fuel injectors 960 and 962 are injecting fuel from their respective fuel rails. To perform Mode 10, with reference to fuel delivery system 1200, fuel pump 934 may be operated at pressure setting ($P_C$) to provide fuel to fuel rail 1250 via fuel passages 1220 and 1224. Pressure setting ($P_C$) can correspond to a resulting fuel pressure at pressure relief valves 1134 and 1114 that exceeds their respective pressure relief settings, thereby enabling fuel to flow from fuel rail 1250 to fuel storage tank 920 and fuel rail 1240 via fuel passages 1210, 1212, and 1214. In this way, fuel may be transferred from a first fuel storage tank to a second fuel storage tank via at least one fuel rail while fuel is delivered to the engine via one or more of injectors 960 and 962. To perform Mode 10, with reference to fuel delivery system 1100, fuel pump 934 may be operated at pressure setting ($P_C$) to provide fuel to fuel rail 992 via fuel passage 1120, fuel rail 990 via fuel passages 1130 and 1110, and fuel storage tank 920 via pressure relief valve 1114. Fuel pump 937 can be optionally operated to assist fuel pump 934. Note that Mode 10 can correspond to valve setting 1084 as previously described with reference to FIG. 10J.

Referring to Mode 11, fuel may be transferred from fuel storage tank 920 to fuel storage tank 930 while one or more of fuel injectors 960 and 962 are injecting fuel from their respective fuel rail. To perform Mode 11, with reference to fuel delivery system 1200, fuel pump 924 may be operated at pressure setting ($P_F$) to provide fuel to fuel rail 1240 via fuel passages 1210 and 1212. Pressure setting ($P_F$) can correspond to a resulting fuel pressure at pressure relief valves 1132 and 1124 that exceeds their respective pressure relief settings, thereby enabling fuel to flow from fuel rail 1240 to fuel storage tank 920 and fuel rail 1250 via fuel passages 1222, 1220, and 1224. Fuel pump 937 can be optionally operated to assist fuel pump 924 deliver fuel of suitable pressure to fuel rail 1250. In this way, fuel may be transferred from the second fuel storage tank to the first fuel storage tank via at least one fuel rail while fuel is delivered to the engine via one or more of injectors 960 and 962. To perform Mode 11, with reference to fuel delivery system 1100, fuel pump 924 may be operated at pressure setting ($P_F$) to provide fuel to fuel rail 992, fuel rail 990, and fuel storage tank 930 via pressure relief valves 1132 and 1122.

While the mode table presented in FIG. 13 provides non-limiting examples of various modes that may be performed by the fuel delivery systems described herein, it should be appreciated that in some examples only one or more of the disclosed modes may be performed.

Figure 14:
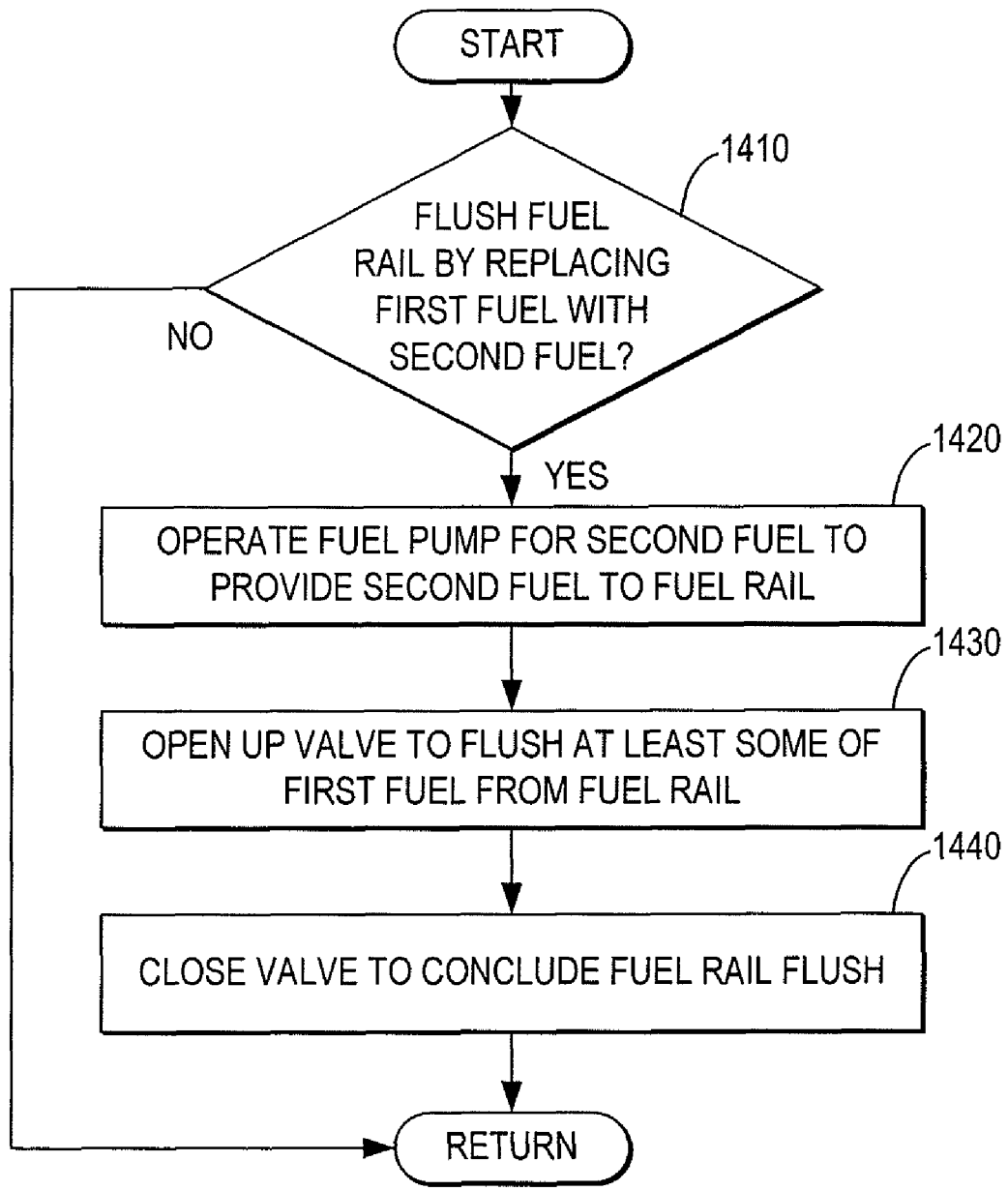
FIG. 14 depicts an example process flow that may be executed by the control system to replace a fuel contained in a fuel rail with a different fuel.

FIG. 14 depicts an example process flow that may be executed by the control system to flush or remove fuel from one of the fuel rails associated with fuel delivery system 1200.

Beginning at 1410, it may be judged whether to flush one or more of the fuel rails by replacing a first fuel contained in the fuel rail with a second fuel. Referring also to FIG. 12, the control system may judge whether fuel rail 1240 or fuel rail 1250 are to be flushed in response to one or more of the assessed operating conditions.

As a non-limiting example, the control system may judge whether to flush fuel rail 1240 based on feedback received from fuel composition sensor 944, and may judge whether to flush fuel rail 1250 based on feedback received from fuel composition sensor 948. For example, the control system may judge whether the appropriate fuel is within the fuel rail for the operating conditions identified by the control system. If the appropriate fuel is within the fuel rail, the answer at 1410 may be judged no, and the process flow may return. Alternatively, if the appropriate fuel for the given operating conditions is not within the fuel rail, the answer at 1420 may be judged yes, and the fuel rail may be flushed by replacing the inappropriate fuel with the appropriate fuel.

In some examples, the control system may judge the answer at 1410 to be yes in response to certain engine events. As one example, the control system may be configured to flush one or more of the fuel rails in response to an engine shut-off or start-up event. As one example, after shut-off of the engine, before start-up of the engine, or during start-up of the engine, the control system may flush the fuel rail to replace an existing fuel with a fuel that is more appropriate for the current or subsequent operating conditions. In this way, startup of the engine may be facilitated or improved by the appropriate fuel.

For example, where a previous operation utilized an ethanol rich fuel supplied to fuel rail 1250 from fuel storage tank 930, the control system may flush fuel rail 1250 after engine shut-off, before the next start-up of the engine, or during the next engine start to replace the ethanol rich fuel contained in fuel rail 1250 with a fuel containing a lower concentration of ethanol, such as gasoline (e.g. supplied from fuel storage tank 920), since gasoline can provide better engine starting in some conditions than the ethanol rich fuel.

As another examples, where a previous operation utilized an ethanol rich fuel supplied to fuel rail 1240 from fuel storage tank 930 via valve 1134, the control system may flush fuel rail 1240 after engine shut-off, before the next start-up of the engine, or during the next engine start to replace the ethanol rich fuel contained in fuel rail 1240 with a fuel containing less ethanol such as gasoline.

At 1420, the appropriate fuel pump may be operated to supply the second fuel to the fuel rail and the appropriate valve may be opened to permit the first fuel to flow from the fuel rail as a result of the second fuel being supplied to the fuel rail. For example, with regards to fuel rail 1240, pump 924 may be operated to supply fuel from fuel storage tank 920 at sufficient pressure to cause valve 1132 to open, thereby causing fuel contained in fuel rail 1240 to be flushed into fuel passages 1220 or 1224. In some examples, valve 1132 may be actively opened or closed by the control system via an actuator to facilitate the flushing of fuel rail 1240 at even lower fuel pressures. The fuel flushed from fuel rail 1240 may be returned to fuel storage tank 930 or may be supplied to fuel rail 1250.

Similarly, with regards to fuel rail 1250, one or more of fuel pumps 934 and 937 may be operated to supply fuel from fuel storage tank 930 at sufficient pressure to cause valve 1134 to open, thereby causing fuel contained in fuel rail 1250 to be flushed into fuel passages 1210 and 1212. In some examples, valve 1134 may be actively opened or closed by the control system via an actuator to facilitate the flushing of fuel rail 1250 at even lower fuel pressures. The fuel flushed from fuel rail 1250 may be returned to fuel storage tank 920 or may be supplied to fuel rail 1240.

At 1440, the valve opened at 1430 may be closed to conclude the fuel rail flush. Where pressure relief valve are used, the control system may reduce the fuel pressure provided the fuel rail by the fuel pump at 1420, or the control system may actively close the valve by operating an actuator associated with the valve where an actuator is provided. In this way, the control system can be configured to replace a fuel contained in a fuel rail and the various fuel passages of the fuel delivery system in response to operating conditions so that an appropriate fuel can be supplied to the engine.

In each of the embodiments described here, the transfer of fuel between different fuel tanks or different fuel injectors may enable operation of a particular fuel delivery mode to be extended under some conditions. For example, by transferring fuel to the direct injectors or the fuel tank associated with the direct injectors when the initial fuel has been exhausted, charge cooling effects provided by the direct injection of fuel may be maintained at least to some extent by the transfer of another fuel. Further still, since overheating of the direct injectors may occur if fuel delivery by the direct injectors is discontinued for a substantial period of time, the transfer of fuel also enables operation of the direct injectors to be extended, thereby reducing overheating of the direct injectors.

FIG. 15 illustrates a process flow that may be used to identify fuel properties of one or more fuels stored on-board the vehicle. While the process flow of FIG. 15 illustrates several different approaches that may be used by the control system to identify fuel properties, it should be appreciated that these approaches may be used independent of each other or in combination. The fuel properties that may be identified by the control system may include, but are not limited to: a composition of the fuel such as an alcohol concentration of the fuel, a fuel type, a latent heat of vaporization of the fuel, a characteristic of the fuel such as its ability to suppress knock or its ability to start the engine, among other suitable fuel properties.

At 1510, fuel properties of one or more fuels stored on-board the vehicle may be identified responsive to fuel transfer operations that were previously performed. For example, the control system, in identifying a fuel property of one or more fuels, may consider an initial amount of fuel in each fuel tank before a fuel transfer operation has been performed, a composition of one or more of the fuels in each fuel tank before the fuel transfer operation has been performed, and an amount of fuel that has been transferred to one or more of the fuel tanks by the fuel transfer operation.

For example, if a first fuel tank includes pure gasoline and a second fuel tank includes pure ethanol, a subsequent transfer of a portion of the pure gasoline to the second fuel tank may result in a blended fuel including a mixture of gasoline and ethanol, where the concentration of ethanol in the blended fuel may be identified by the control system from the amount of gasoline that was transferred to the second fuel tank, the amount of the ethanol that was in the second fuel tank before the fuel transfer, and/or the total amount of the blended fuel that is in the second fuel tank after the fuel transfer.

At 1512, the control system may identify fuel properties responsive to exhaust air-fuel ratio from a known amount of each fuel delivered to the engine. For example, the control system may utilize feedback from an exhaust gas sensor arranged in the exhaust stream of the combusted fuel or fuels to identify fuel composition. FIG. 16 illustrates a non-limiting example approach for identifying fuel composition from exhaust air-fuel ratio.

At 1514, the control system may utilize feedback received from one or more fuel sensors that are configured to identify a fuel property. For example, one or more of the fuel tanks may include an alcohol sensor for identifying a concentration of alcohol in the fuel. Note that other suitable fuel sensors may be used.

At 1516, the control system may identify fuel properties responsive to engine performance feedback. For example, where a first fuel is delivered to the engine from a first fuel tank at start-up of the engine, the control system may identify a property of the first fuel responsive to engine speed or torque produced during the start-up operation. As another example, the control system may identify the extent to which knock has been suppressed by delivery of a second fuel to the engine (e.g. via direct injection) during an increased knock condition. For example, the control system may receive feedback from knock sensor, where this feedback may be used to identify the knock suppression capability of the second fuel to infer alcohol concentration or the latent heat of vaporization of the second fuel.

FIG. 16 illustrates a process flow that may be used to identify fuel properties of each fuel stored on-board the vehicle responsive to exhaust air-fuel ratio. At 1610, it may be judged whether fuel is currently being delivered to the engine from the second fuel tank and whether fuel is currently being delivered to the engine from the first fuel tank. As previously described with reference to 314 of FIG. 3, the fuel being delivered to the engine from the second fuel tank via direct injection may be a blended fuel that was created by a previous fuel transfer event from the first fuel tank to the second fuel tank (or vice-versa). If it is judged that fuel is currently being delivered to the engine from the second fuel tank (e.g. via direct injection) and fuel is not currently being delivered to the engine from the first fuel tank (e.g. via port injection), then the process flow may proceed to 1612.

At 1612, a property of the fuel delivered to the engine from the second fuel tank (e.g. via direct injection) may be identified responsive to exhaust air-fuel ratio obtained from the combusted fuel. As one example, the control system may utilize feedback received from an exhaust gas sensor to identify the composition of a first fuel that is delivered to the engine while a second different fuel is not delivered to the engine.

From 1612 or if the answer at 1610 is judged no, the process flow may proceed to 1614. At 1614, it may be judged whether fuel is currently being delivered to the engine from the first fuel tank and whether fuel is currently being delivered to the engine from the second fuel tank. If it is judged that fuel is currently being delivered to the engine from the first fuel tank (e.g. via port injection) and fuel is not currently being delivered to the engine from the first fuel tank (e.g. via direct injection), then the process flow may proceed to 1616.

At 1616, a property of the fuel delivered to the engine from the first fuel tank (e.g. via port injection) may be identified responsive to exhaust air-fuel ratio obtained from the combusted fuel. As one example, the control system may utilize feedback received from an exhaust gas sensor to identify the composition (e.g. alcohol concentration or latent heat of vaporization) of a first fuel that is delivered to the engine while a second different fuel is not delivered to the engine. In this way, the control system may utilize air-fuel ratio feedback to identify the composition or other suitable property of the fuels stored on-board the vehicle when only one of the fuels is used at the engine.

In some embodiments, as described at 1510 for example, the control system may utilize information associated with previous fuel transfers to supplement the exhaust air-fuel ratio to identify the properties associated with of one or more different fuels stored on-board the vehicle. For example, the control system may maintain a running tally of the amount of fuel transferred between each fuel tank, and may utilize this information to further identify the fuel composition of each fuel. As a non-limiting example, the control system may utilize fuel transfer amounts (e.g. as judged by the duty cycle of the transfer pump and/or fuel level changes) to update the fuel properties identified for each fuel between conditions where only one of the two fuels is combusted at the engine. For example, where a property of a first fuel has been identified responsive to air-fuel ratio when only the first fuel was combusted at the engine, and a subsequent transfer of a second fuel to the fuel tank that holds the first fuel is performed, the control system may update the property identified for the first fuel in accordance with the amount of second fuel transferred to the fuel tank and a property of the second fuel. In this way, the control system may identify fuel properties even when both fuels are being delivered to the engine.

In some embodiments, the control system may account for residual fuel that has not been combusted at the engine after delivery of that fuel to the engine has been discontinued when utilizing exhaust air-fuel ratio to identify fuel properties. For example, the decisions at 1610 or 1614 may incorporate a delay that accounts for wall wetting of the non-delivered fuel or other delays associated with fuel transport time from the point of injection to combustion at the cylinders. As one example, at 1612, the control system may utilize exhaust air-fuel ratio obtained from an exhaust gas sensor after a prescribed period of time has elapsed after delivery of the first fuel to the engine has been discontinued. In this way, the control system may ensure that the exhaust air-fuel ratio obtained from an exhaust gas sensor accounts for combustion of only (or primarily) the second fuel. In other embodiments, the control system may employ an adjustment factor to account for fuel wall wetting or other delays between discontinued delivery of a fuel and its combustion at the engine.

Regardless of how the properties of each fuel are determined, the control system may adjust engine boosting in response to these properties. For example, as previously described with reference to FIG. 7B, the level of boost may be reduced or limited as the knock suppression capability of the directly injected fuel (e.g. as identified from concentration of alcohol or latent heat of vaporization of the directly injected fuel) decreases.

In some embodiments, the control system may carry out an engine control method that comprises: combusting fuel from a first fuel tank during a first engine operating condition; combusting fuel from a second fuel tank during a second engine operating condition; transferring fuel from said first fuel tank to said second fuel tank when a fuel level of the second fuel tank falls below a predetermined level; delivering air to the engine from an air compressor (e.g. a compressor stage of a boosting device); and adjusting said compressor (e.g. to increase or decrease boost) based on a combustion characteristic of fuel from said second tank. As previously described, the compressor may be adjusted to reduce boost as the concentration of alcohol in the fuel from the second fuel tank decreases, as the octane of the fuel from the second fuel tank decreases, or as the latent heat of vaporization of the fuel from the second fuel tank decreases. As such, in some examples, the fuel from the second fuel tank includes ethanol. In some examples, the fuel from the second fuel tank includes a higher octane fuel than the fuel from the first fuel tank. The combustion characteristic of fuel from the second fuel tank may include latent heat of vaporization. The combustion characteristic of fuel from the second fuel tank may include octane, octane rating, and/or alcohol concentration. In some examples, the first engine operating condition includes a lower engine load than the second engine operating condition.

In some embodiments, the above method may further include adaptively learning the octane from an indication of engine knock, which may be received by the control system via a knock sensor that is coupled to the engine. In some embodiments, the above method may further include adaptively learning the alcohol concentration from exhaust air-fuel ratio when the fuel from the first fuel tank is not combusted at the engine. In some embodiments, the method may further include: after the transfer of fuel, performing an open loop correction of the alcohol concentration of the fuel from the second fuel tank responsive to a parameter of the transferring, where the parameter may include an amount of the fuel transferred from the first fuel tank to the second fuel tank and an amount of fuel in the second fuel tank before the transferring. In some embodiments, the above method may further comprise: adjusting the compressor based on the alcohol concentration of the fuel from said first fuel tank; and adaptively learning the alcohol concentration of the fuel from the first fuel tank based on exhaust air-fuel ratio during the first engine operating condition when the fuel from the second fuel tank is not combusted at the engine. In some embodiments, the method may further comprise: performing an open loop correction of the alcohol concentration of the fuel from the first fuel tank while the adaptive learning the alcohol concentration of the fuel from the first fuel tank is catching up. For example, since adaptively learning may be performed during only select conditions (e.g. such as when only one fuel is combusted at the engine), an open loop correction (e.g.

factor) may be applied to the learned fuel properties responsive to the fuel transfer between conditions where adaptive learning is performed.

Note that the example process flows included herein can be used with various fuel delivery system, engine system, and/or vehicle system configurations. These process flows may represent one or more of any number of processing strategies such as event-driven, interrupt-driven, multi-tasking, multi-threading, and the like that may be performed by the control system. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or operations may be repeatedly performed depending on the particular strategy being used. Further, the described acts may graphically represent code to be programmed into a computer readable storage medium of the control system.

It should be appreciated that while many of the process flows have been described herein in the context of a control system implementation, in other examples, the various fuel delivery modes of operation may be manually selected by a user via a user input device, including one or more of a switch, a button, or a graphical user interface or display. Thus, some or all of the depicted processes that provide the various fuel delivery characteristics and functionality described herein may be manually performed by a user such as the vehicle operator. It will be appreciated that the configurations and process flows disclosed herein are exemplary in nature, and that these specific embodiments are not to be considered in a limiting sense, because numerous variations are possible.

The subject matter of the present disclosure includes all novel and nonobvious combinations and subcombinations of the various systems and configurations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an internal combustion engine, comprising:
    selectively transferring a first fuel type from a first fuel tank to a second fuel tank responsive to an amount of a second fuel type at the second fuel tank to create a blended fuel at the second fuel tank;
    delivering the first fuel type from the first fuel tank to the engine by port injection;
    delivering the blended fuel from the second fuel tank to the engine by direct injection;
    boosting intake air supplied to the engine via a boosting device;
    adjusting a level of said boosting as a composition of the blended fuel varies; and
    adjusting a first and second fuel pump to effect the selective transfer of the first fuel type.

2. The method of claim 1, further comprising:
    combusting one or more of the blended fuel delivered to the engine by direct injection and the first fuel type delivered to the engine by port injection at the engine to produce exhaust gas;
    where the composition of the blended fuel includes a concentration of alcohol in the blended fuel; and where the method further comprises:
    identifying the concentration of alcohol in the blended fuel from a composition of the exhaust gas produced by the engine when the blended fuel is delivered to the engine from the second fuel tank and when the first fuel type is not delivered to the engine from the first fuel tank.

3. The method of claim 2, further comprising:
    adjusting an amount of the blended fuel delivered to the engine from the second fuel tank by direct injection relative to an amount of the first fuel type delivered to the engine from the first fuel tank by port injection responsive to an operating condition.

4. The method of claim 3, where the operating condition includes engine load; and
    where adjusting the amount of the blended fuel delivered to the engine by direct injection relative to the amount of the first fuel type delivered to the engine by port injection includes increasing the amount of the blended fuel delivered to the engine by direct injection relative to the amount of the first fuel type delivered to the engine by port injection as the engine load increases.

5. The method of claim 3, where the operating condition includes an indication of engine knock; and
    where adjusting the amount of the blended fuel delivered to the engine by direct injection relative to the amount of the first fuel type delivered to the engine by port injection includes increasing the amount of the blended fuel delivered to the engine by direct injection relative to the amount of the fuel delivered to the engine by port injection as the indication of engine knock increases.

6. The method of claim 2, where the composition of the exhaust gas is identified via an exhaust gas sensor disposed in an exhaust passage of the engine through which the exhaust gas produced by the engine flows.

7. The method of claim 2, where the composition of the exhaust gas includes oxygen content of the exhaust gas.

8. The method of claim 1, where the composition of the blended fuel includes a latent heat of vaporization of the blended fuel; and
    where varying the level of said boosting responsive to the composition of the blended fuel includes reducing the level of said boosting as the latent heat of vaporization of the blended fuel decreases.

9. The method of claim 1, where the composition of the blended fuel includes an alcohol content of the blended fuel; and
    where varying the level of said boosting responsive to the composition of the blended fuel includes reducing the level of said boosting as the alcohol content of the blended fuel decreases.

10. The method of claim 9, where the blended fuel delivered to the engine from the second fuel tank by direct injection includes a higher concentration of alcohol than the first fuel type delivered to the engine from the first fuel tank by port injection.

11. The method of claim 9, further comprising:
    adjusting an amount of the blended fuel delivered to the engine from the second fuel tank by direct injection relative to an amount of the first fuel type delivered to the engine from the first fuel tank by port injection responsive to an operating condition;

combusting one or more of the blended fuel delivered to the engine by direct injection and the first fuel type delivered to the engine by port injection at the engine to produce exhaust gas;

directing the exhaust gas to an exhaust gas sensor; and identifying the alcohol content of the blended fuel responsive to feedback received from the exhaust gas sensor when the blended fuel is delivered to the engine by direct injection and when the first fuel type is not delivered to the engine from the first fuel tank by port injection.

12. The method of claim 11, further comprising:

further adjusting the level of said boosting as an alcohol content of the first fuel type delivered to the engine by port injection varies.

13. The method of claim 12, further comprising:

identifying the alcohol content of the first fuel type delivered to the engine by port injection responsive to feedback received from the exhaust gas sensor when the first fuel type is delivered to the engine by port injection and when the blended fuel is not delivered to the engine by direct injection.

14. A method of operating an engine, comprising:

delivering a first fuel type from a first fuel tank to the engine by direct injection;

delivering a second fuel type from a second fuel tank to the engine by port injection;

boosting intake air supplied to the engine;

transferring the second fuel type from the second fuel tank to the first fuel tank to create a blended fuel at the first fuel tank with the first fuel type;

varying a level of said boosting of the intake air responsive to an alcohol content of at least one of the blended fuel or the second fuel type; and selectively operating a first and second fuel pump at different pressure levels to deliver the first and second fuel types and to transfer the second fuel type.

15. The method of claim 14, where said varying the level of said boosting includes increasing the level of said boosting as the alcohol content of the blended fuel increases or the alcohol content of the second fuel type increases; and reducing the level of said boosting as the alcohol content of the blended fuel decreases or the alcohol content of the second fuel type decreases.

16. The method of claim 15, further comprising:

identifying the alcohol content of the blended fuel via an exhaust gas sensor from exhaust gas produced by the engine when only the blended fuel is delivered to the engine; and identifying the alcohol content of the second fuel type via the exhaust gas sensor from exhaust gas produced by the engine when only the second fuel type is delivered to the engine.

17. An engine control method, comprising:

combusting a first fuel type from a first tank during a first engine operating condition;

combusting a second fuel type from a second tank during a second engine operating condition;

transferring the first fuel type from said first tank to said second tank when a second fuel type level falls below a predetermined level;

delivering air to the engine from an air compressor;

adjusting said compressor based on a combustion characteristic of the second fuel type; and selectively operating a first and second fuel pump, and further operating each of the fuel pumps at different pressures depending on operating conditions.

18. The method of claim 17, wherein said first fuel type from said second fuel tank includes ethanol.

19. The method of claim 17, wherein said second fuel type from said second fuel tank includes a higher octane fuel than said first fuel type from said first fuel tank.

20. The method of claim 17, wherein said combustion characteristic of the second fuel type from said second fuel tank is latent heat of vaporization.

* * * * *